United States Patent
Fischer et al.

(10) Patent No.: US 10,960,840 B2
(45) Date of Patent: Mar. 30, 2021

(54) AIRBAG WITH NOTCHED DEPLOYMENT CONTROLLING FLAP

(71) Applicant: TRW Vehicle Safety Systems Inc., Washington, MI (US)

(72) Inventors: Kurt F. Fischer, Rochester, MI (US); Alexandra E. Schroeder, Lenox, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 44 days.

(21) Appl. No.: 16/176,084

(22) Filed: Oct. 31, 2018

(65) Prior Publication Data

US 2020/0130631 A1    Apr. 30, 2020

(51) Int. Cl.
| | |
|---|---|
| *B60R 21/201* | (2011.01) |
| *B60R 21/237* | (2006.01) |
| *B60R 21/2334* | (2011.01) |
| *B60R 21/205* | (2011.01) |
| *B60R 21/00* | (2006.01) |
| *B60R 21/16* | (2006.01) |
| *B60R 21/231* | (2011.01) |
| *B60R 21/2338* | (2011.01) |

(52) U.S. Cl.
CPC .......... *B60R 21/201* (2013.01); *B60R 21/205* (2013.01); *B60R 21/237* (2013.01); *B60R 21/2334* (2013.01); *B60R 2021/0032* (2013.01); *B60R 2021/161* (2013.01); *B60R 2021/23153* (2013.01); *B60R 2021/23386* (2013.01)

(58) Field of Classification Search
CPC ... B60R 21/201; B60R 21/205; B60R 21/207; B60R 21/2334; B60R 21/2338; B60R 21/237; B60R 2021/0032; B60R 2021/161; B60R 2021/23153; B60R 2021/23386
See application file for complete search history.

(56) References Cited

U.S. PATENT DOCUMENTS

| | | | | |
|---|---|---|---|---|
| 5,160,164 A | * | 11/1992 | Fischer | B60R 21/233 280/732 |
| 5,282,646 A | * | 2/1994 | Melvin | B60R 21/233 280/728.1 |

(Continued)

FOREIGN PATENT DOCUMENTS

JP    2018099928 A  *  6/2018

*Primary Examiner* — Laura Freedman
(74) *Attorney, Agent, or Firm* — Tarolli, Sundheim, Covell & Tummino LLP

(57) ABSTRACT

An apparatus for helping to protect an occupant of a vehicle comprises an airbag inflatable from a stored condition to a deployed condition in which the airbag is positioned between a reaction surface of the vehicle and the occupant. The airbag comprises an upper portion and a lower portion. Each of the upper and lower portions is at least one of rolled and folded. The upper and lower portions are positioned overlying each other when in the stored condition. A deployment flap comprises a sheet of material having a first end portion and an oppositely disposed second end portion. The first end portion is secured to the vehicle. A portion of the deployment flap is positioned between the upper and lower portions. The deployment flap has a notch with opposite side edges converging in a direction toward the first end portion of the deployment flap and terminating at a vertex.

27 Claims, 12 Drawing Sheets

(56) References Cited

U.S. PATENT DOCUMENTS

| | | | | |
|---|---|---|---|---|
| 5,348,343 | A * | 9/1994 | Hawthorn | B60R 21/16 280/730.1 |
| 5,613,698 | A * | 3/1997 | Patercsak | B60R 21/201 280/728.1 |
| 5,636,861 | A * | 6/1997 | Orsulak | B60R 21/16 280/730.1 |
| 5,765,867 | A * | 6/1998 | French | B60R 21/16 280/743.1 |
| 6,371,510 | B1 * | 4/2002 | Marriott | B60R 21/201 280/730.1 |
| 6,474,686 | B1 * | 11/2002 | Higuchi | B60R 21/203 280/731 |
| 6,877,772 | B2 * | 4/2005 | Fischer | B60R 21/205 280/730.1 |
| 7,021,653 | B2 * | 4/2006 | Burdock | B60R 21/201 280/730.1 |
| 7,568,730 | B2 * | 8/2009 | Kwon | B60R 21/201 280/728.2 |
| 7,625,008 | B2 * | 12/2009 | Pang | B60R 21/231 280/743.1 |
| 7,731,230 | B2 | 6/2010 | Fischer et al. | |
| 7,770,925 | B2 * | 8/2010 | Seymour | B60R 21/201 280/728.2 |
| 8,056,924 | B2 * | 11/2011 | Hatfield | B60R 21/201 280/728.2 |
| 8,240,701 | B2 * | 8/2012 | Cheal | B60R 21/201 280/728.2 |
| 8,272,664 | B2 * | 9/2012 | Benny | B60R 21/201 280/728.1 |
| 8,308,188 | B2 * | 11/2012 | Kumagai | B60R 21/2338 280/732 |
| 8,407,968 | B2 * | 4/2013 | Lachat | B60R 21/201 280/743.1 |
| 8,408,596 | B2 * | 4/2013 | Matsunaga | B60R 21/201 280/732 |
| 8,485,553 | B1 * | 7/2013 | Kuhne | B60R 21/205 280/732 |
| 8,622,417 | B1 * | 1/2014 | Schneider | B60R 21/2338 280/729 |
| 8,840,141 | B1 * | 9/2014 | Fischer | B60R 21/205 280/743.2 |
| 9,663,063 | B2 * | 5/2017 | Kunitake | B60R 21/201 |
| 9,707,921 | B2 | 7/2017 | Fischer et al. | |
| 9,815,428 | B2 * | 11/2017 | Anderson | B60R 21/2338 |

* cited by examiner

AIRBAG WITH NOTCHED DEPLOYMENT CONTROLLING FLAP

FIELD OF THE INVENTION

The present invention relates to an apparatus for helping to protect an occupant of a vehicle. More particularly, the present invention relates to an airbag inflatable between an instrument panel and a front seat of a vehicle. Further, the present invention relates to an airbag inflatable between a seat back of a front seat of the vehicle and a rear seat of the vehicle.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle so as to position the airbag between the instrument panel and any occupants of these seats. Such airbags may be driver airbags or passenger airbags. When inflated, the driver and passenger airbags help protect the occupants from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

SUMMARY

According to one aspect, an apparatus for helping to protect an occupant of a vehicle includes an airbag inflatable from a stored condition to a deployed condition in which the airbag is positioned between a reaction surface of the vehicle and the vehicle occupant. The airbag comprises an upper portion and a lower portion. Each of the upper and lower portions is at least one of rolled and folded. The upper and lower portions are positioned overlying each other when in the stored condition. A deployment flap comprises a sheet of material having a first end portion and an oppositely disposed second end portion. The first end portion is secured to the vehicle. A portion of the deployment flap is positioned between the upper and lower portions. The deployment flap has a notch with opposite side edges converging in a direction toward the first end portion of the deployment flap and terminating at a vertex.

According to another aspect, alone or in combination with any other aspect, the notch is configured so that opposite side edges are positioned on opposing sides of a portion of the occupant's face when a portion of the occupant's face engages the airbag during initial deployment of the airbag.

According to another aspect, alone or in combination with any other aspect, the notch is triangular-shaped and opens at a second end of the deployment flap. The opposite side edges converge from the second end in a direction toward the first end portion and a first end of the deployment flap. The first end is opposite to the second end.

According to another aspect, alone or in combination with any other aspect, the deployment flap is at least one of formed from and coated with a material that provides a frictional engagement between the deployment flap and one of the upper and lower portions sufficient to at least partially restrict and delay the initial deployment of one of the upper and lower portions.

According to another aspect, alone or in combination with any other aspect, the deployment flap at least partially surrounds one of the upper and lower portions of the airbag when the airbag is in the stored condition so as to at least partially restrict and delay initial deployment of the surrounded one of the upper and lower portions.

According to another aspect, alone or in combination with any other aspect, during deployment of the airbag, as a result of the deployment flap restricting and delaying the initial deployment one of the upper and lower portions, the other of the upper and lower portions deploys in advance of the restricted one of the upper and lower portions.

According to another aspect, alone or in combination with any other aspect, the deployment flap has a first surface and a second surface. The first surface of the deployment flap contacts at least a portion of the lower portion when the deployment flap is positioned between the upper and lower portions. The second surface of the deployment flap contacts at least a portion of the upper portion when the deployment flap is positioned between the upper and lower portions.

According to another aspect, alone or in combination with any other aspect, the frictional engagement between the lower portion and the first surface of the deployment flap is greater than frictional engagement between the upper portion and the second surface of the deployment flap.

According to another aspect, alone or in combination with any other aspect, the deployment flap has a first surface and a second surface. The first surface of the deployment flap contacts at least a portion of the upper portion when the deployment flap is positioned between the upper and lower portions. The second surface of the deployment flap contacts at least a portion of the lower portion when the deployment flap is positioned between the upper and lower portions.

According to another aspect, alone or in combination with any other aspect, the frictional engagement between the upper portion and the first surface of the deployment flap is greater than frictional engagement between the lower portion and the second surface of the deployment flap.

According to another aspect, alone or in combination with any other aspect, the deployment flap comprises a central portion wrapped around the lower portion and the second end portion is tucked under the lower portion while the airbag is in the stored condition.

According to another aspect, alone or in combination with any other aspect, the deployment flap helps inhibit initial inflation and deployment of the lower portion. The deployment flap is free from inhibiting initial inflation and deployment of the upper portion.

According to another aspect, alone or in combination with any other aspect, the deployment flap is at least partially around and tucked under the lower portion to frictionally engage and thus inhibit initial inflation and deployment of the lower portion.

According to another aspect, alone or in combination with any other aspect, the deployment flap comprises a central portion wrapped around the upper portion and the second end portion is tucked under the upper portion while the airbag is in the stored condition.

According to another aspect, alone or in combination with any other aspect, the deployment flap helps inhibit initial inflation and deployment of the upper portion. The deployment flap is free from inhibiting initial inflation and deployment of the lower portion.

According to another aspect, alone or in combination with any other aspect, the deployment flap is at least partially around and tucked under the upper portion to frictionally engage and thus inhibit initial inflation and deployment of the upper portion.

According to another aspect, alone or in combination with any other aspect, the apparatus further comprises a housing for receiving the airbag in the stored condition. The airbag and the deployment flap are secured to the housing.

According to another aspect, alone or in combination with any other aspect, in the deployed condition, the airbag comprises a front portion presented toward the seat having an inflatable volume for receiving a penetrating occupant when the airbag is in the deployed condition. A rear portion is connected to the front portion and has an inflatable volume spaced from the front portion by a space. The front portion is positioned between the vehicle occupant and the rear portion when the protection device is in the deployed condition. A top portion interconnects the front portion and the rear portion such that the airbag is hook-shaped in the deployed condition. Only the top portion connects the front portion to the rear portion.

According to another aspect, alone or in combination with any other aspect, the upper portion of the airbag in the stored condition comprises the top portion and the lower portion of the airbag in the stored condition comprises at least one of the rear and front portions.

According to another aspect, alone or in combination with any other aspect, the deployment flap comprises a central portion wrapped around the upper portion, and accordingly the top portion, and the second end portion is tucked under the upper portion, and accordingly the top portion, while the airbag is in the stored condition.

According to another aspect, alone or in combination with any other aspect, the deployment flap is at least one of formed from and coated with a material that provides a frictional engagement between the deployment flap and one of the upper and lower portions sufficient to at least partially restrict and delay the initial deployment of one of the upper and lower portions.

According to another aspect, alone or in combination with any other aspect, the deployment flap is at least partially wrapped around and tucked under the upper portion, and accordingly the top portion, to frictionally engage and thus inhibit initial inflation and deployment of the upper portion, and accordingly the top portion.

According to another aspect, alone or in combination with any other aspect, the airbag is a rear airbag for helping to protect a rear seat occupant of the vehicle. The airbag is stored in a seat back of a front seat of the vehicle such that seat back comprises the reaction surface.

According to another aspect, alone or in combination with any other aspect, the airbag is a frontal airbag for helping to protect a front seat occupant of the vehicle. The airbag is stored in an instrument panel of the vehicle such that instrument panel comprises the reaction surface.

According to another aspect, alone or in combination with any other aspect, the airbag is a passenger frontal airbag for helping to protect a front seat occupant on a passenger side of the vehicle.

According to another aspect, alone or in combination with any other aspect, an airbag module comprises the apparatus.

According to another aspect, alone or in combination with any other aspect, a vehicle safety system comprises the airbag module.

DRAWINGS

The foregoing and other features of the present invention will become apparent to one skilled in the art to which the present invention relates upon consideration of the following description of the invention with reference to the accompanying drawings, in which.

DETAILED DESCRIPTION

Figure 1:
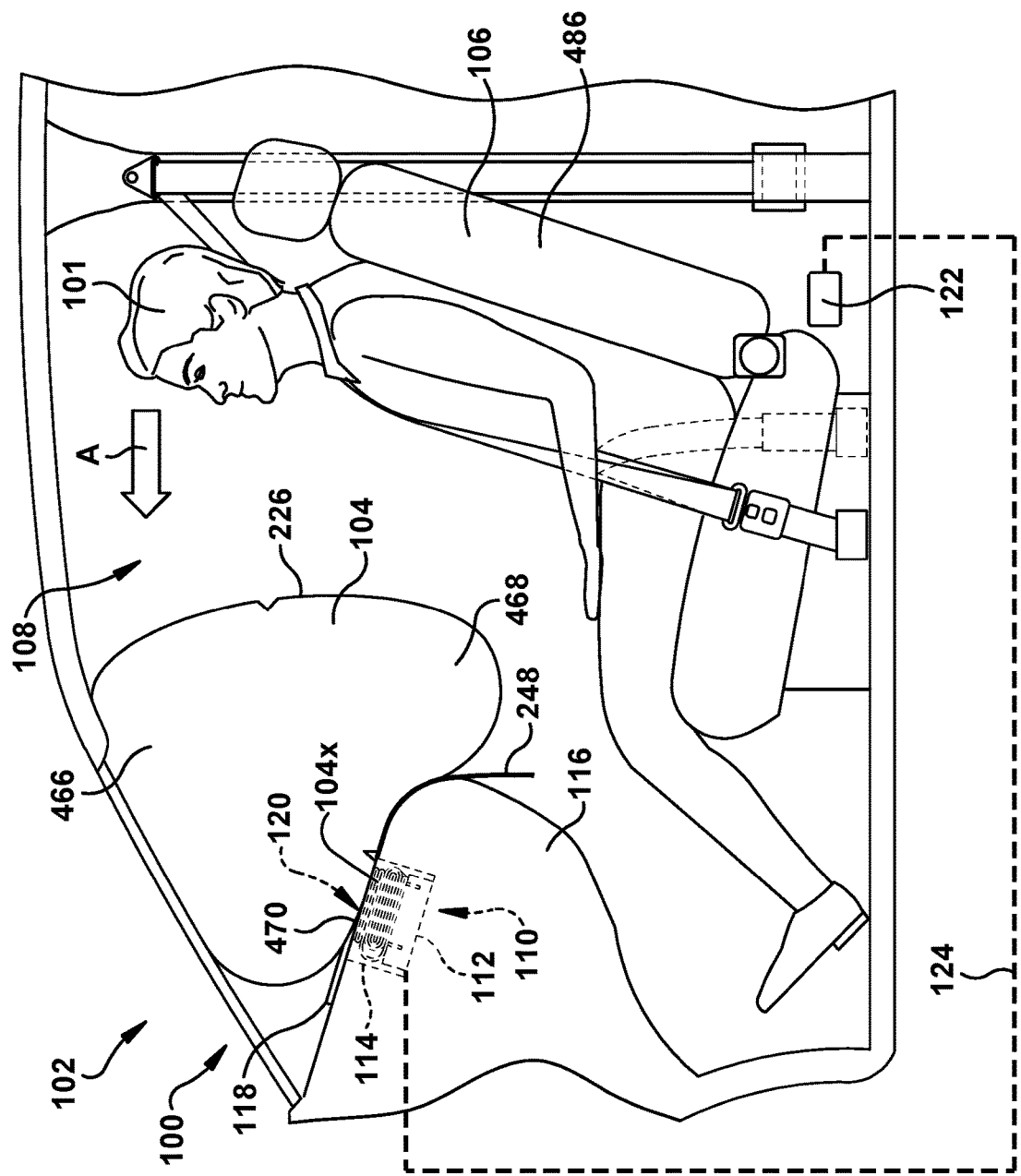
FIG. 1 is a schematic side view illustrating an apparatus for helping to protect an occupant of a vehicle, in a first example configuration.

An apparatus 100 for helping to protect an occupant 101 of a vehicle 102 includes an inflatable vehicle occupant protection device 104 in the form of an airbag. In the example configuration of FIGS. 1-9, the airbag 104 can be a passenger frontal airbag for helping to protect an occupant 101 of a seat 106 on a passenger side 108 of the vehicle 102.

The airbag 104 may be part of an airbag module 110 that includes an inflator 112 and a housing 114. The airbag 104 has a stored condition, indicated by dashed lines at 104x in FIG. 1, in which the airbag is folded and placed in the housing 114. The airbag module 110 is mounted to a dash or instrument panel 116 of the vehicle 102. The housing 114 helps contain and support the airbag 104 and inflator 112 in the instrument panel 116.

An airbag door 118 is releasably connected to the instrument panel 116 and/or the housing 114. In a closed condition (not shown), the airbag door 118 forms a cover for the airbag module 110 and helps enclose the airbag 104 in the stored condition in the housing 114. The airbag door 118 is movable to an opened condition illustrated in FIG. 1 to uncover an opening 120 through which the airbag 104 may be deployed from the stored condition in the housing 114. The door 120 may be connected to the vehicle 102, e.g., the instrument panel 116, either directly or through the housing 114, by means (not shown), such as a hinge, strap, or tether.

The inflator 112 is operatively connected to the airbag 104 and is actuatable to provide inflation fluid for inflating the airbag from the stored condition to a deployed condition, which can be seen in FIG. 1. Those skilled in the art will appreciate that the desired deployed condition of the airbag 104 may vary among different vehicle models, depending on factors such as available space in the passenger compartment and the architecture of the vehicle. The inflator 112 may be of any known type, such as stored gas, solid propellant, augmented, or hybrid. The apparatus 100 can include a sensor, illustrated schematically at 122, for sensing an event for which inflation of the airbag 104 is desired, such as a collision. The inflator 112 can be operatively connected to the sensor 122 via lead wires 124.

The airbag 104 can be constructed of any suitable material, such as nylon (e.g., woven nylon 6-6 yarns), and can be constructed in any suitable manner. For example, the airbag 104 can include one or more pieces or panels of material that are interconnected by known means, such as stitching, ultrasonic welding, heat bonding, or adhesives, to form the airbag. Alternatively, the airbag 104 could have a one piece woven construction in which the airbag is woven as a single piece of material. Also, the airbag 104 can be uncoated, coated with a material, such as a gas impermeable urethane, or laminated with a material, such as a gas impermeable film. The airbag 104 thus can have a gas-tight or substantially gas-tight construction. Those skilled in the art will appreciate that alternative materials, such as polyester yarn, and alternatives coatings, such as silicone, can also be used to construct the airbag 104.

Figure 2:
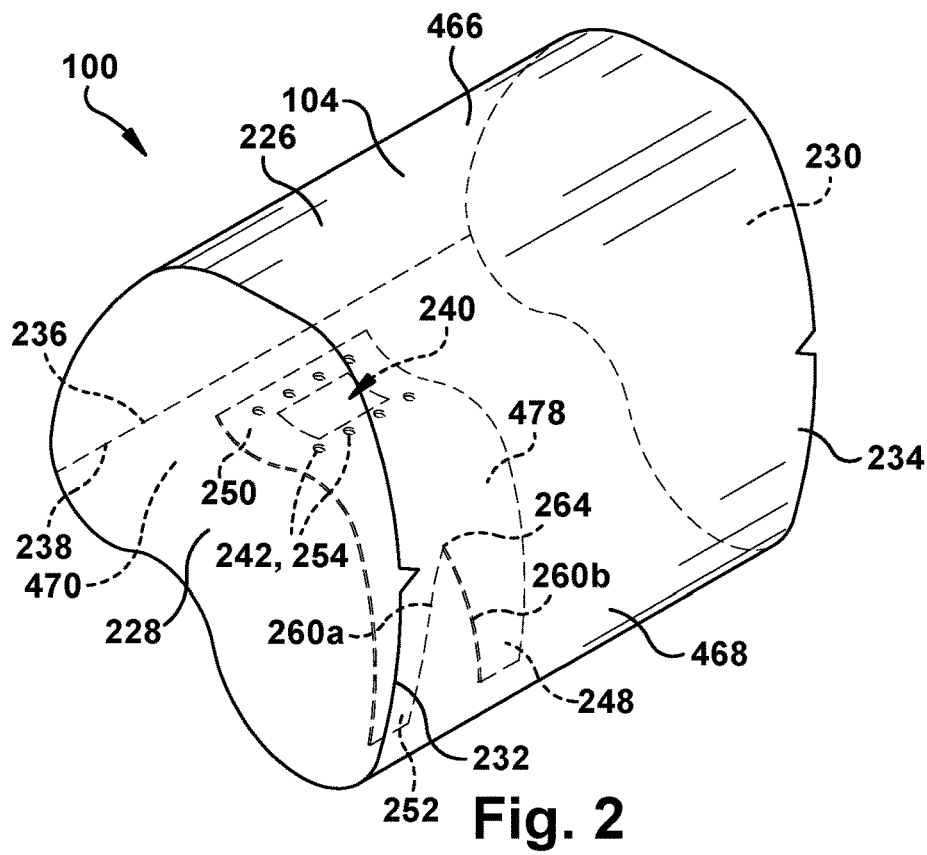
FIG. 2 is a perspective view of a portion of the apparatus of FIG. 1.

FIG. 2 illustrates by way of example one particular construction of the airbag 104 of FIG. 1. The airbag 104 includes a center panel 226 and first and second side panels 228, 230. The center panel 226 includes first and second longitudinal edge portions 232, 234 and opposite end portions 236, 238.

The first and second side panels 228, 230 have curved and contoured configurations that define the profile of the airbag 104, as shown in FIG. 1. The side panels 228, 230 thus help define the inflated configuration (e.g., shape and depth) of the airbag 104. In this first embodiment, the side panels 228, 230 are configured such that the inflated configuration of the airbag 104 follows the contour of the instrument panel 116 of the vehicle 102. Those skilled in the art will appreciate that the desired inflated configuration of the airbag 104 may vary among different vehicle models, depending on factors such as available space in the passenger compartment and the architecture of the vehicle.

The center panel 226 includes an opening 240 for receiving inflation fluid for inflating the airbag 104. The center panel 226 also includes apertures 242 for receiving fasteners 344 (see FIG. 4), such as bolts or studs, for connecting the airbag 104 to other components of the airbag module 110 (e.g., to the housing 114). When the airbag 104 is connected to the housing 114 of the airbag module 110, the opening 240 provides fluid communication between the housing and an inflatable volume 246 of the airbag.

Figure 3:
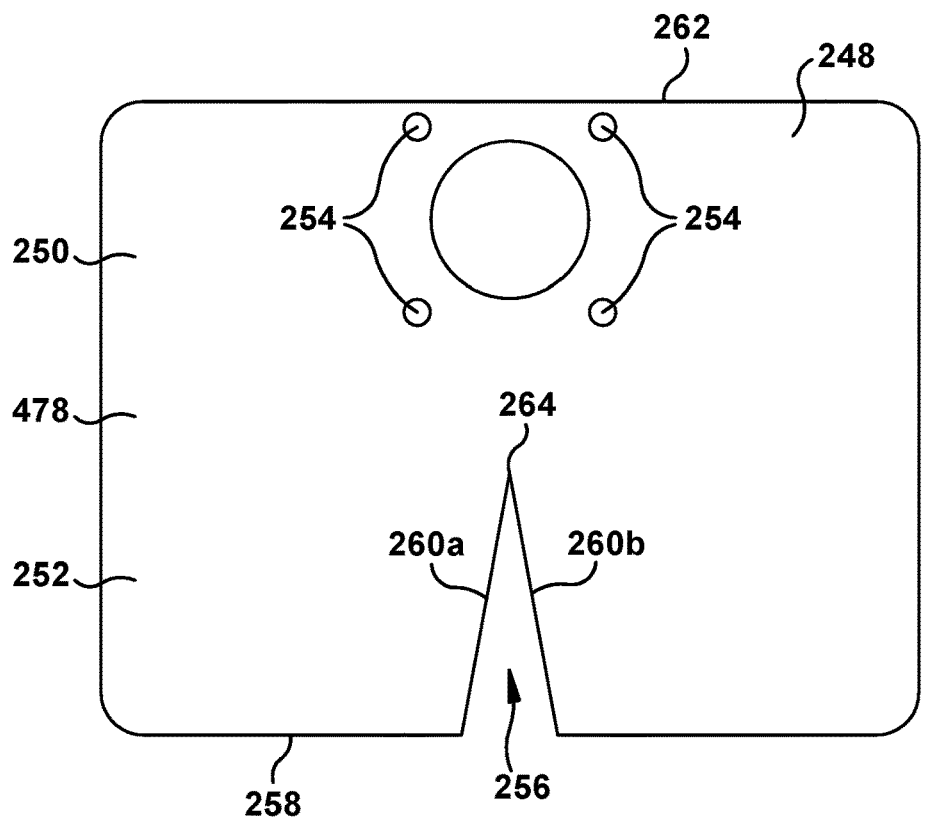
FIG. 3 is a top view of a portion of the apparatus of FIG. 1.

As shown in FIGS. 1-3, the apparatus 100 includes a deployment flap 248 for helping to control deployment of the airbag 104. The deployment flap 248 comprises a sheet of material having a first end portion 250 and an oppositely disposed second end portion 252. The first end portion 250 can be secured to the vehicle 102, such as through the airbag module 110. The deployment flap 248 can, for example, be secured to the airbag module 110 via the fasteners 344 (e.g., bolts or studs) that also secure the airbag 104 to the airbag module. As shown in FIGS. 1-2, the deployment flap 248 is positioned beneath the airbag 104, between the airbag and the instrument panel 116. The deployment flap 248 has a first end portion 250 that includes one or more apertures 254 that align with the apertures 242 in the airbag 104 and thus receive the fasteners 344 that connect the airbag and deployment flap to the airbag module 110 (see FIG. 4).

As shown in FIGS. 2-3, the second end portion 252 of the deployment flap 248 has a notch 256 formed therein. In the example construction of FIGS. 2-3, the notch 256 opens at a second end 258 of the deployment flap 248 with opposite side edges 260 (shown here as opposite side edges 260a and 260b) converging in a direction toward the first end portion 250 and a first end 262 of the deployment flap, which is opposite to the second end, and terminating at a vertex 264. The notch 256 in the deployment flap 248 is configured so that the opposite side edges 260a, 260b of the notch can be positioned on opposing sides of a portion of the occupant's face 792, such as the occupant's chin 794, if a portion of the occupant's face 792 engages the airbag 104 during the initial inflation and deployment of the airbag. The notch 256 thus provides the ability for the occupant 101 to engage the airbag 104 before the airbag reaches the fully inflated and deployed condition without impeding the ability of the deployment flap 248 to control the deployment of the airbag. In the illustrated example construction, it will be noted that the opposite side edges 260a, 260b are substantially straight and form a straight edged v-shaped, or triangular-shaped, notch 256. Those skilled in the art will appreciate that that the notch 256 may have any desired configuration, such as, for example, the opposite side edges 260a, 260b having a slightly convex curvature, the notch being substantially U-shaped, or the notch being rectangular-shaped.

Figure 4:
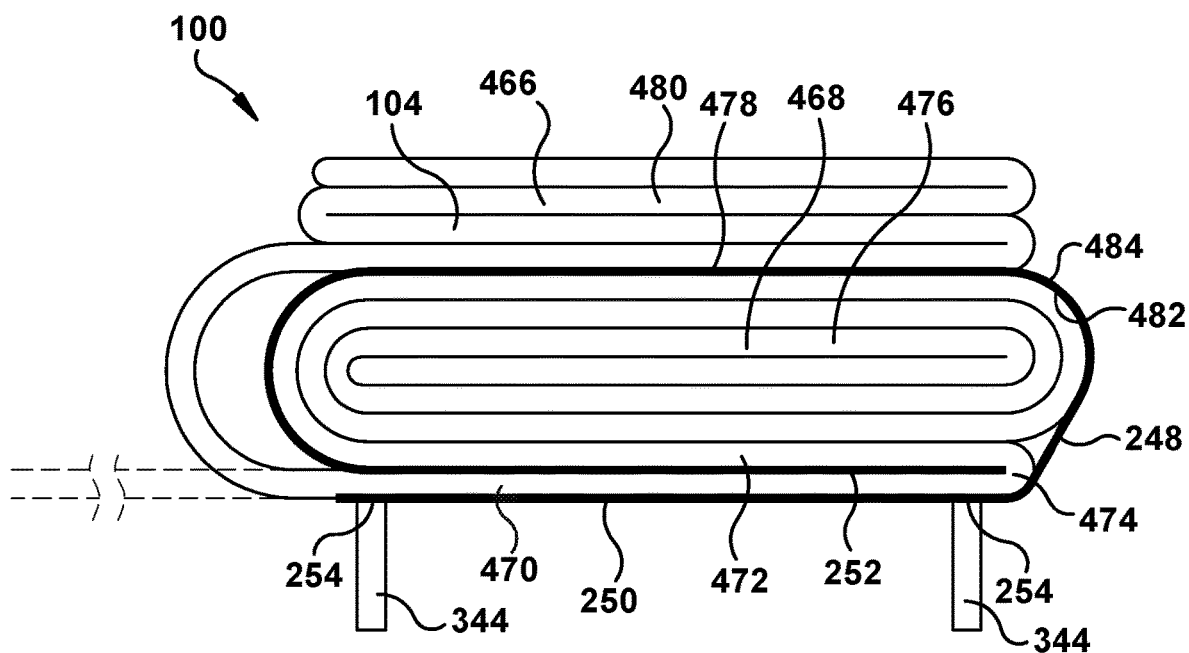
FIG. 4 is a side view of a portion of the apparatus of FIG. 1 in a deflated and stored condition.

FIG. 4 shows the example configuration of the airbag of FIGS. 1-9 in the stored condition. The airbag 104 has a first or upper portion 466, a second or lower portion 468, and a third or base portion 470, which is positioned between the upper and lower portions when the airbag is in a flattened condition. The base portion 470 coincides with the housing 114 and includes the inflation fluid receiving opening 240.

The upper portion 466, the lower portion 468, and the base portion 470 extend laterally across the airbag 104 and laterally in the vehicle 102, as viewed from the perspective of the occupant 101 of the seat 106 when the airbag is in the inflated condition of FIG. 1. The upper portion 466 is positioned generally upward from the base portion 470 and from the housing 114 when the airbag 104 is in the inflated and deployed condition of FIG. 1. The lower portion 468 is positioned generally downward from the base portion 470 and from the module housing 114 when the airbag 104 is in the inflated and deployed condition of FIG. 1.

Referring to FIG. 4, the lower portion 468 has a flip-folded portion 472, i.e., a portion that is flipped or folded about a fold line indicated generally at 474, when the airbag 104 is in the stored condition. The lower portion 468 further comprises a roll-folded portion 476, i.e., a portion that is roll-folded toward the fold line 474, when the airbag 104 is in the stored condition. As shown in FIG. 4, the roll-folded portion 476 is positioned adjacent and overlying the flip-folded portion 472.

The deployment flap 248 is wrapped around the overlying flip-folded portion 472 and the roll-folded portion 476. The deployment flap 248 has the second end portion 252 that is tucked between the flip-folded portion 472 and the base portion 470 of the airbag 104, and thus tucked under the lower portion 468. A central portion 478 of the deployment flap 248 extends over the lower portion 468 and is positioned between the lower portion and the upper portion 466. The deployment flap 248 thus encircles/surrounds or substantially encircles/surrounds the lower portion 468. The upper portion 466 is folded to extend around and overlie the lower portion 468 wrapped in the deployment flap 248. The upper portion 466 comprises a fan-folded portion 480, i.e., a portion that is folded back and forth in opposite directions, that overlies the lower portion 468 wrapped in the deployment flap 248. Thus, in the stored condition, a first surface 482 of the deployment flap 248 contacts at least a portion of the lower portion 468 and at least a portion of the base portion 470. A second surface 484 of the deployment flap 248, opposite the first surface 482, can contact at least a portion of the upper portion 466 and at least a portion of the base portion 470 when the deployment flap is positioned between the upper and lower portions 466, 468.

The upper portion 466 and the lower portion 468 are thus packaged separately in the stored condition of FIG. 4. By "packaged separately," it is meant that the upper portion 466 and the lower portion 468 are rolled, folded, or otherwise placed in the stored condition as separate and distinct portions of the airbag 104. This allows the deployment flap 248 to be wrapped around the lower portion 468 without affecting the upper portion 466.

The upper portion 466 and the lower portion 468 are also packaged in manners different from each other when in the stored condition of FIG. 4. Particularly, the upper portion 466 has a simple fan fold packaging, whereas the lower portion 468 has a flip folded and rolled packaging, as described above. Advantageously, these different packaging methods may be selected to provide desired inflation and deployment behavior of the airbag 104. For example, the fan fold of the upper portion 466 provides minimal resistance to inflation and deployment, and thus helps promote rapid unrestricted deployment of the upper portion. The flip folded and rolled of the lower portion 468 promotes inflation and deployment of the lower portion in engagement with and along the instrument panel 116, as described below.

In one example construction, the deployment flap 248 can be formed from a material that provides a frictional engagement between the deployment flap and the lower portion 468 of the airbag 104. In another example construction, the deployment flap 248 can be constructed of a material, such as airbag fabric, that is coated with a material that provides a frictional engagement between the deployment flap and the lower portion 468 of the airbag 104. The material that the deployment flap 248 is formed from can be high-density polyethylene that provides the frictional engagement between the first deployment flap and the lower portion 468 of the airbag 104. Alternatively, the deployment flap 248 can be constructed of a different material, such as airbag fabric, that has a layer of material, such as high-density polyethylene, applied, such as by coating or lamination, that provides the frictional engagement between the deployment flap and the lower portion 468 of the airbag 104.

The frictional engagement between the deployment flap 248 and the lower portion 468 is sufficient to at least partially restrict and delay the initial deployment of the lower portion while the upper portion 466 deploys unrestricted or substantially unrestricted. Although at least a portion of the second surface 484 of the deployment flap 248 can contact at least a portion of upper portion 466, any frictional engagement between the upper portion and the second surface of the deployment flap is less than the frictional engagement between at least a portion of the lower portion 468 and the first surface 482 of the deployment flap so that the initial deployment of the lower portion is restricted and delayed while the upper portion deploys unrestricted or substantially unrestricted.

Upon sensing the occurrence of an event for which inflation of the airbag 104 is desired, such as a vehicle collision, the sensor 122 provides a signal to the inflator 112 via the lead wires 124. Upon receiving the signal from the sensor 122, the inflator 112 is actuated and provides inflation fluid to the inflatable volume 246 of the airbag 104 in a known manner. The inflating airbag 104 exerts a force on the airbag door 118, which moves the airbag door to the opened condition. The airbag 104 inflates from the stored condition to the deployed condition illustrated in solid lines in FIGS. 1-2. In particular, the inflated airbag 104 deploys from the housing 114 away from the instrument panel 116 in an aft direction toward the occupant 101. The instrument panel 116 therefore acts as a reaction surface of the vehicle 102 for the deploying airbag 104 of the example configuration of FIGS. 1-9. The airbag 104, while inflated, is positioned between the instrument panel 116 and the occupant 101 to help protect the vehicle occupant 101 from impacts with parts of the vehicle 102, such as the instrument panel.

As the airbag 104 inflates and deploys, the fan folds of the upper portion 466 offer comparatively minimal resistance to inflation and deployment. The flip folded and rolled lower portion 468 promotes inflation and deployment of the lower portion in engagement with and along the instrument panel 116. As the lower portion 468 inflates and deploys, the flip-folded portion 472 initially unfolds ("flips"), placing the roll-folded portion 476 against the instrument panel 116. The roll-folded portion 476 unrolls toward the instrument panel 116, and thus engages and inflates along the instrument panel.

When an event for which inflation of the airbag 104 occurs, the occupant 101 moves in the forward direction indicated by the arrow labeled "A" in FIG. 1 into engagement with the airbag 104. In FIG. 1, the occupant 101 is shown in a normally seated position, generally upright and positioned against a seat back 486 of the seat 106. As a result, the airbag 104 inflates and deploys to a normally inflated position shown in FIG. 1.

Figure 5:
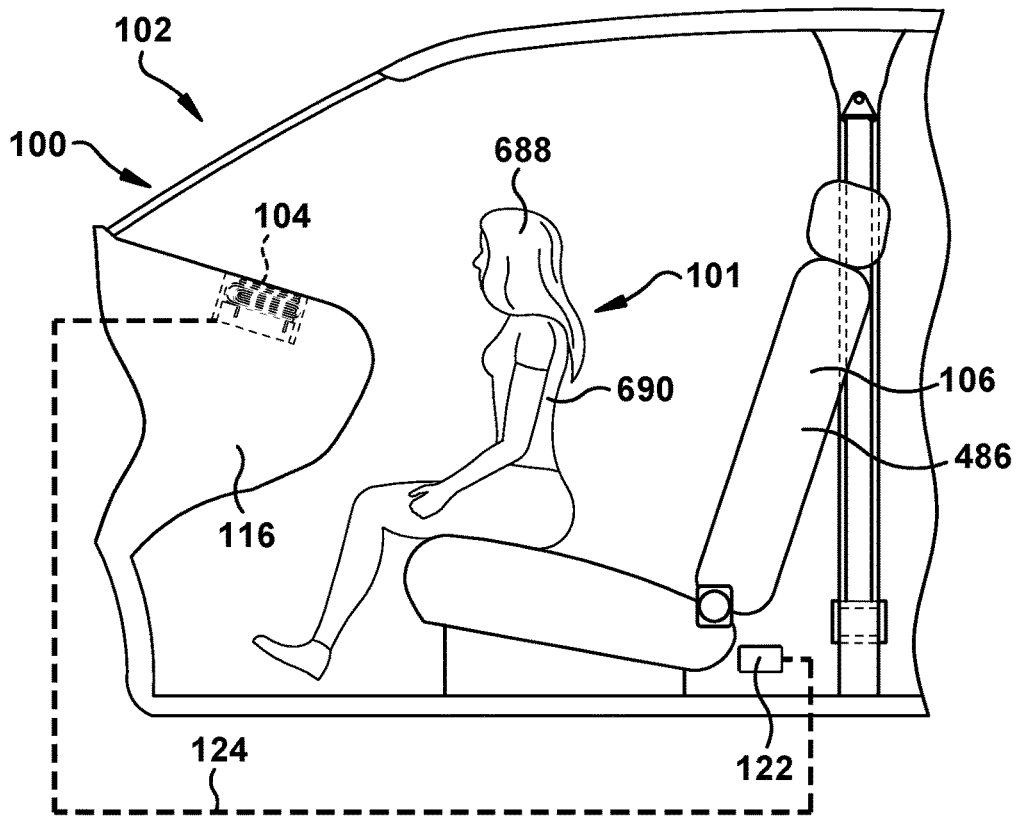
FIGS. 5-9 are schematic views illustrating an example sequence of operation of the apparatus of FIG. 1.

Referring to FIG. 5, the occupant 101 is positioned away from the normally seated position. More particularly, in FIG. 5, the occupant 101 is a small occupant, such as a small woman or child, that is unbelted and positioned forward on the seat 106, away from the seat back 486 and relatively close to the instrument panel 116. As a result, upon the occurrence of the event for which deployment of the airbag 104 is desired, the occupant 101 may move forward in the vehicle 102 in the direction identified generally at "B" in FIG. 6 into engagement with the airbag.

Figure 6:
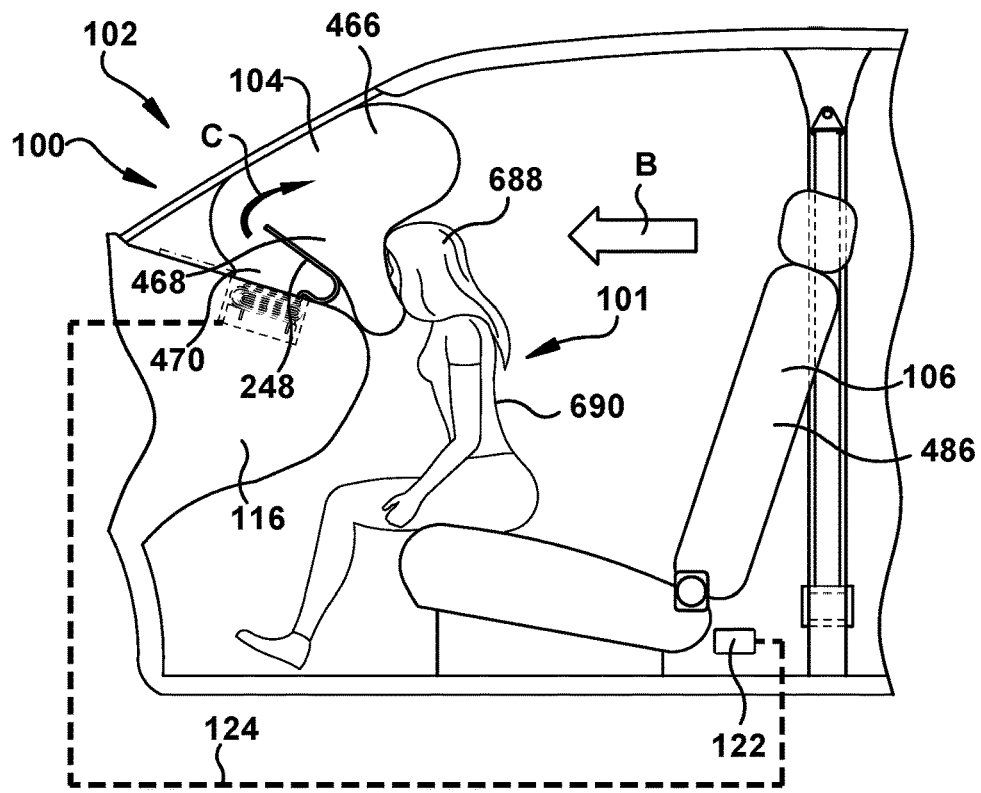

According to the present invention, the deployment flap 248 helps control deployment of the airbag 104 to help distribute inflation and deployment forces evenly across the head 688 and torso 690 of the occupant 101 if the occupant engages the airbag before the airbag reaches the fully inflated and deployed condition. This is illustrated in FIGS. 6-9. Referring to FIG. 6, prior to inflation and during the initial inflation and deployment of the airbag 104, the deployment flap 248 is wrapped around the lower portion 468 of the airbag (see also FIG. 4). As the airbag 104 initially inflates and deploys, friction between the deployment flap 248 and the lower portion 468 impedes or inhibits the lower portion from inflating and deploying freely.

Meanwhile, the upper portion 466 is free from impediment or inhibition from the deployment flap 248 and is thus free to deploy in advance of the restricted lower portion 468. The upper portion 466 deploys in directions generally upward and rearward in the vehicle 102, in the direction identified generally at "C" in FIG. 6. By impeding and inhibiting the lower portion 468 from inflating and deploying freely, the deployment flap 248 may at least partially aid in directing the upper portion 466 to inflate in this direction. Because the occupant 101 is a relatively small occupant positioned relatively close to the instrument panel 116, the upper portion 466 inflates and deploys at least partially or substantially above or over the occupant's head 688.

Figure 7:
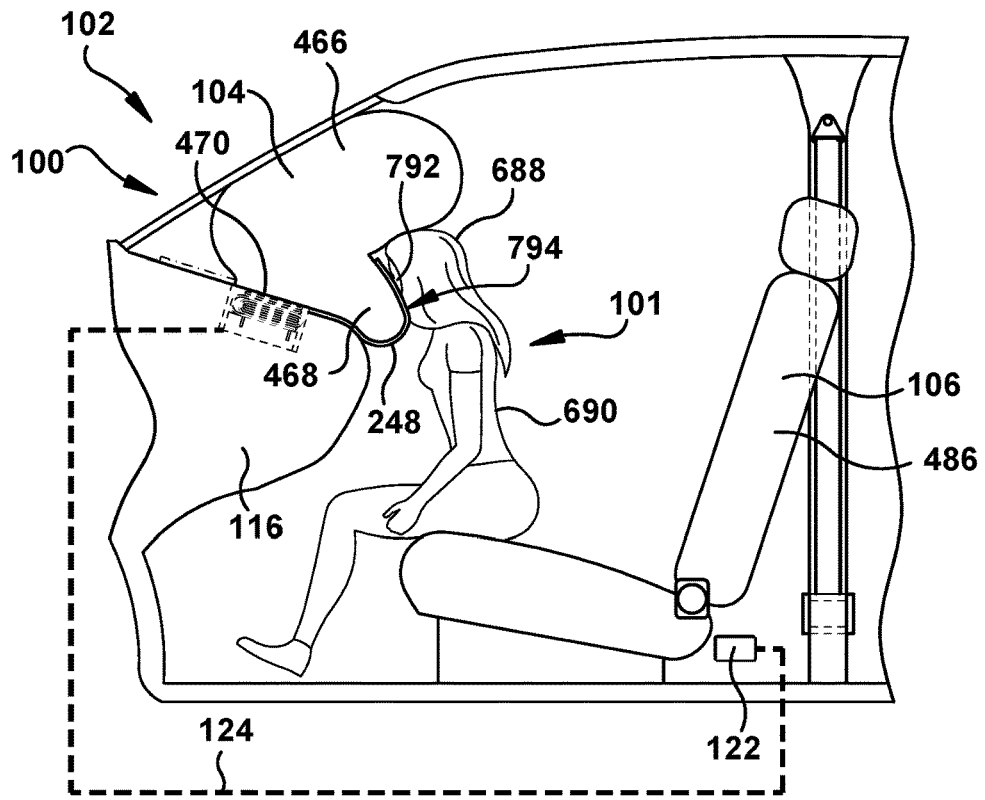
Figure 8:
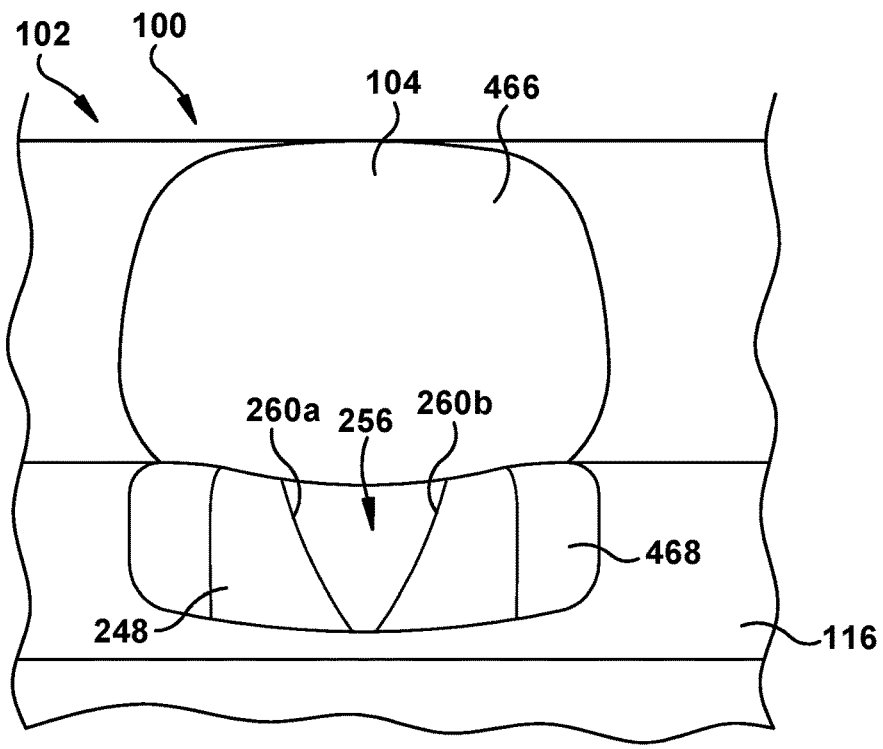

As shown in FIG. 7, at a certain point in time during inflation of the airbag 104, the occupant's face 792 may engage the airbag at a location adjacent to the deployment flap 248, such as at the lower portion 468 of the airbag. In such case, because the deployment flap 248 has the notch 256, the occupant's face 792 does not engage, or at least does not substantially engage, the deployment flap. In particular, the notch 256 is configured so that the opposite side edges 260a, 260b of the notch are positioned on opposing sides of at least a portion of the occupant's face 792, such as the occupant's chin 794, when a portion of the occupant's face engages the airbag 104 during the initial inflation and deployment of the airbag. As shown in FIG. 8, the notch 256 thus forms a recess in the deployment flap 248 for receiving the occupant's face 792 so that the occupant's face substantially engages the airbag 104, such as the lower portion 468 of the airbag, and does not engage, or at least does not substantially engage, the deployment flap. As shown in FIGS. 6-9, the notch 256 in the deployment flap 248 does not hinder the deployment flap's ability to impede or inhibit the lower portion 468 from inflating and deploying freely as the airbag 104 initially inflates and deploys.

Figure 9:
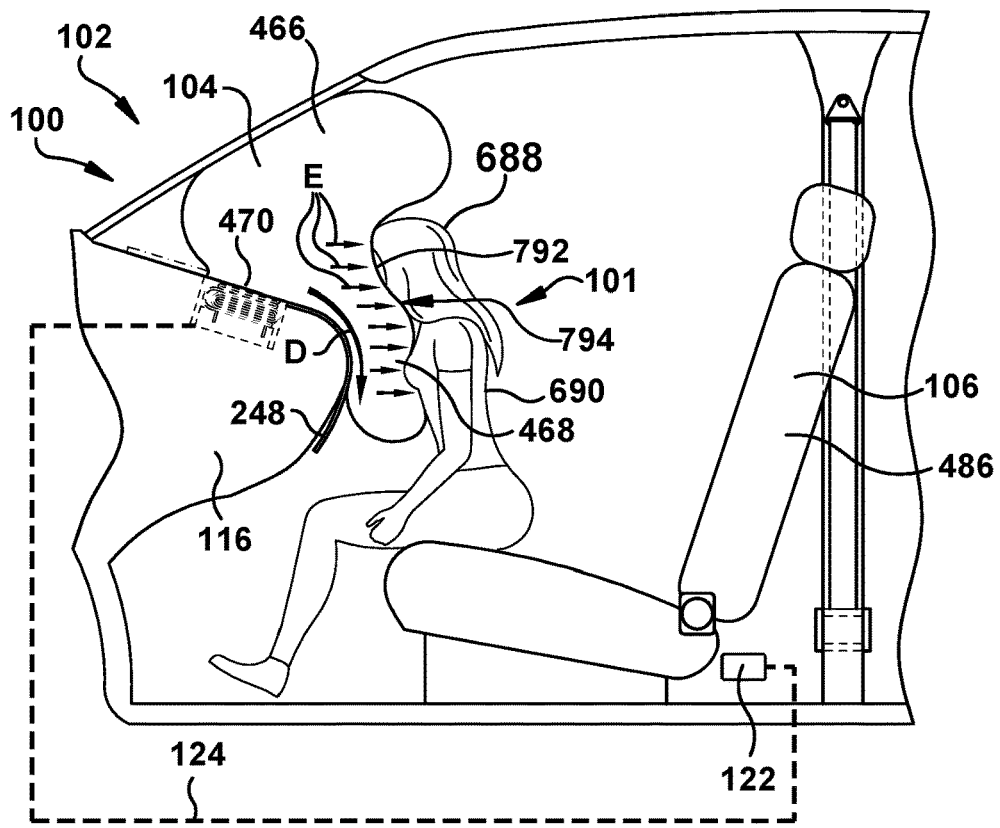

Referring to FIG. 9, the airbag 104 eventually inflates and pressurizes to a degree at which the friction between the deployment flap 248 and the lower portion 468 is overcome. At this point, the lower portion 468 is permitted to inflate and deploy. The lower portion 468 deploys downward along the instrument panel 116 in the direction indicated generally by the arrow identified at "D" in FIG. 9. The lower portion 468 becomes positioned between the instrument panel 116 and the occupant 101. The deployment flap 248 moves to a position extending downward along the instrument panel 116 and becomes positioned between the airbag 104 and the instrument panel. The notch 256 provides the added benefit that the deployment flap 248 does not move or drag across the occupant's face 792 as the deployment flap moves to a position extending downward along the instrument panel 116 because the occupant's face is positioned in the notch, i.e., between the opposing side edges 260a, 260b of the notch, during the initial inflation and deployment of the airbag 104.

Once the lower portion 468 is positioned between the instrument panel 116 and the occupant 101, the airbag 104 continues to inflate and deploy toward the normally inflated and deployed condition (see FIG. 1). Because the deployment flap 248 helps direct the upper portion 466 to inflate and deploy over the occupant 101 of FIGS. 5-9 and inhibits deployment of the lower portion 468, the airbag 104 does not impart full inflation and deployment forces on the occupant until the airbag is in the position of FIG. 9. As a result, this helps distribute the inflation and deployment forces exerted on the occupant 101 by the airbag 104 evenly across the head 688 and torso 690 of the occupant, as indicated generally by the arrows identified at "E" in FIG. 9.

FIGS. 10-15 depict the apparatus 100, shown here as the apparatus 100', in another example configuration. Certain components in FIGS. 10-15 are similar or identical to components of the example configuration of FIGS. 1-9. These similar or identical components are given the same reference as FIGS. 1-9. On the other hand, the prime symbol is added to the reference numbers of components in FIGS. 10-15 that are at least partially dissimilar to the components of FIGS. 1-9 to avoid confusion.

Figure 10:
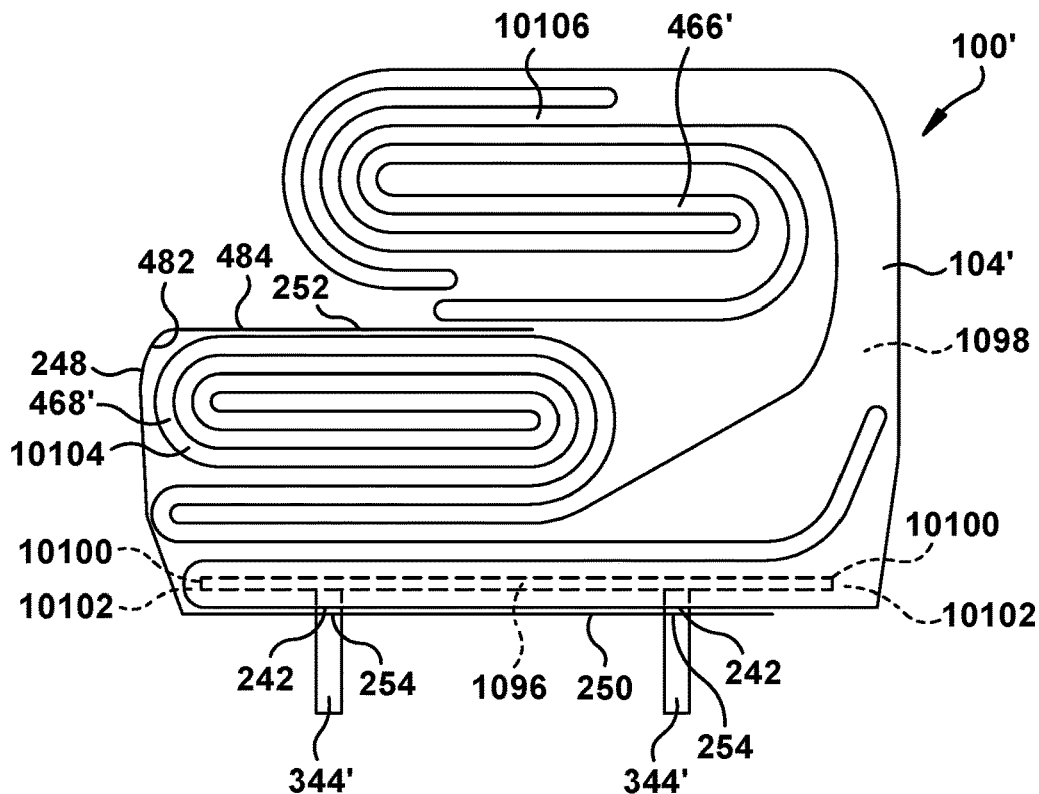
FIG. 10 is a side view of a portion of an apparatus for helping to protect an occupant of a vehicle, in a second example configuration, and with the portion in a deflated and stored condition.

As shown in FIG. 10, at least a portion of the airbag 104' can have apertures 242 for receiving fasteners 344', such as bolts or studs, of a retainer 1096 for connecting the airbag to the retainer. In the example configuration of FIGS. 10-15, when the airbag 104' is coupled to the retainer 1096, the retainer can be positioned in an interior 1098 of the airbag so that the fasteners 344' extend out from the interior of the airbag through the apertures 242. Further, when the airbag 104' is coupled to the retainer 1096, opposing side walls 10100 of the retainer can be at least partially surrounded by opposing interior portions 10102 of the airbag.

Figure 11:
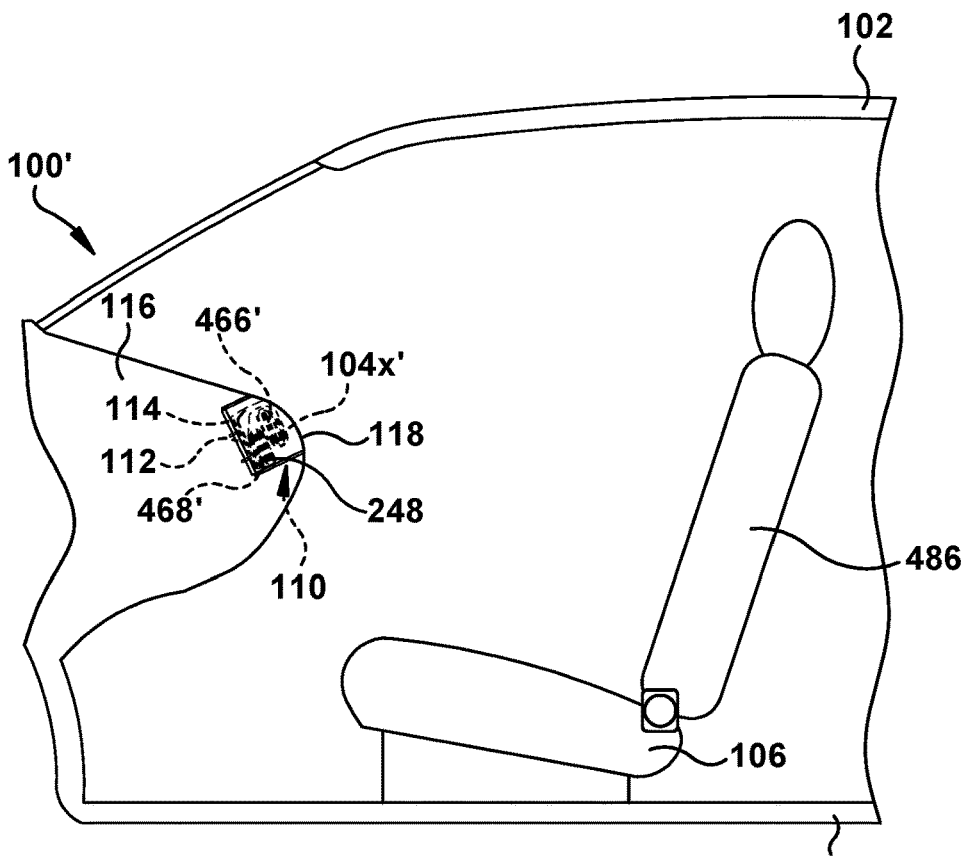
FIGS. 11-15 are schematic views illustrating an example sequence of operation of the apparatus of FIG. 10.

The airbag 104' and the retainer 1096 can be part of the airbag module 110 that includes the inflator 112 and the housing 114. The airbag 104' has a stored condition, as shown in FIG. 10 and indicated by dashed lines at 104x' in FIG. 11, in which the airbag is folded and placed in the housing 114. The airbag module 110 can be mounted to the instrument panel 116 of the vehicle 102 (FIG. 11). The housing 114 can help support and contain the airbag 104', the retainer 1096, and the inflator 112 in the instrument panel 116.

In the example configurations of FIGS. 10-15, the deployment flap 248 can be positioned between upper and lower portions 466', 468' of the airbag 104', which can be folded and/or rolled, as shown, when the airbag is in the stored condition. In particular, when the airbag 104' is in the stored condition, the lower portion 468' of the airbag is rolled/folded at least partially into a rolled lower portion 10104 and positioned at least partially overlying the retainer 1096. The upper portion 466' of the airbag 104' is rolled/folded at least partially into a rolled upper portion 10106 and positioned at least partially overlying the rolled lower portion 10104. The deployment flap 248 is positioned between the rolled upper and lower portions 10106, 10104 of the airbag 104'. The first surface 482 of the deployment flap 248 contacts at least a portion of the rolled lower portion 10104 and a second surface 484 of the deployment flap, opposite the first surface, can contact at least a portion of the rolled upper portion 10106 when the deployment flap is positioned between the rolled upper and lower portions.

The first deployment flap 248 is secured/connected to a structure in the vehicle 102, such as the airbag module 110. In the example configuration of FIGS. 10-15, the deployment flap 248 is secured to the retainer 1096. The deployment flap 248 can, for example, be secured to the retainer 1096 via the fasteners 344' that also secure the airbag 104' to the retainer. The first end portion 250 of the deployment flap 248 includes the one or more apertures 254 that align with the apertures 242 in the airbag 104' and thus receive the fasteners 344' that connect the airbag and deployment flap to the airbag module 110.

The deployment flap 248 extends from the retainer 1096 so that at least a portion of the deployment flap adjacent to the second end portion 252 can be positioned between rolled upper and lower portions 10106, 10104 of the airbag 104' when the airbag is in the stored condition. In this configuration, the deployment flap 248 can at least partially surround the rolled lower portion 10104 of the airbag 104' when the airbag is in the stored condition.

In one example construction, the deployment flap 248 can be formed from a material that provides a frictional engagement between the deployment flap and the rolled lower portion 10104 of the airbag 104'. In another example construction, the deployment flap 248 can be constructed of a material, such as airbag fabric, that is coated with a material that provides a frictional engagement between the deployment flap and the rolled lower portion 10104 of the airbag 104'. The material that the deployment flap 248 is formed from can be high-density polyethylene that provides the frictional engagement between the deployment flap and the rolled lower portion 10104 of the airbag 104'. Alternatively, the deployment flap 248 can be constructed of a different material, such as airbag fabric, that has a layer of material, such as high-density polyethylene, applied, such as by coating or lamination, that provides the frictional engagement between the deployment flap and the rolled lower portion 10104 of the airbag 104'.

The frictional engagement between the deployment flap 248 and the rolled lower portion 10104 is sufficient to at least partially restrict and delay the initial deployment of the lower portion 468' while the upper portion 466' deploys unrestricted or substantially unrestricted. Although at least a portion of the second surface 484 of the deployment flap 248 can contact at least a portion of the upper portion 466', such as a portion of the rolled upper portion 10106, any frictional engagement between the upper portion and the second surface of the deployment flap is less than the frictional engagement between at least a portion of the lower portion 468', such as a portion of the rolled lower portion 10106, and the first surface 482 of the deployment flap so that the initial deployment of the lower portion is restricted and delayed while the upper portion deploys unrestricted or substantially unrestricted.

Figure 12:
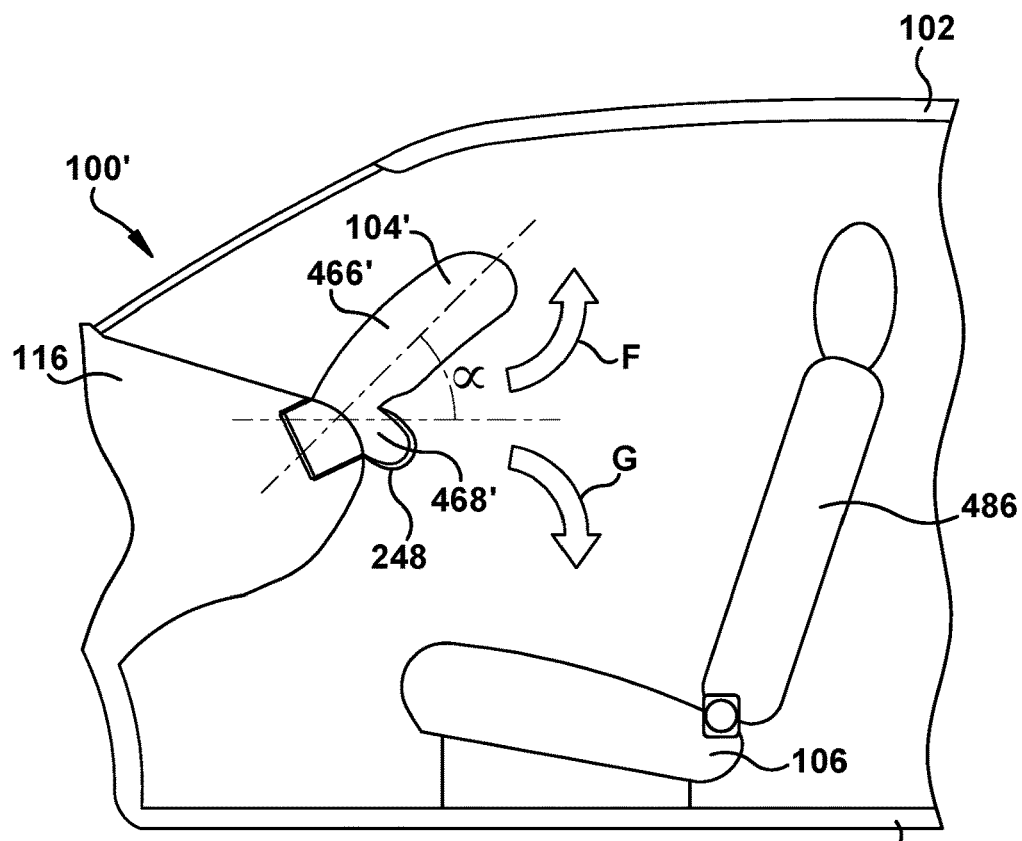

As shown in FIGS. 10-11, prior to inflation and during the initial inflation and deployment of the airbag 104', the deployment flap 248 at least partially surrounds or encircles the lower portion 468' of the airbag so as to at least partially restrict and delay the initial deployment of the lower portion, while the upper portion 466' deploys. The particular folding and rolling of the airbag 104' of the example configuration shown in FIG. 10 causes the general deployment of the upper portion 466' of the airbag to follow a trajectory/direction as shown as an arrow "F" in FIGS. 12 and 14. The particular folding and rolling of the airbag 104' causes the general deployment of the lower portion 468' of the airbag to follow a trajectory/direction as shown as an arrow "G" in FIGS. 12 and 14. However, the lower portion 468' is folded and rolled in such a manner that a portion of the lower portion is urged to unfurl, i.e., deploy, into and/or against the deployment flap 248 as the airbag 104' initially inflates and deploys. As shown in FIG. 12, the frictional engagement between the deployment flap 248 and the lower portion 468' at least partially restricts, impedes and/or inhibits the lower portion from unfurling/deploying while the upper portion 466' deploys unimpeded. The deployment flap 248 thus at least partially restricts and delays the initial deployment of the lower portion 468' in the direction of arrow G.

Figure 13:
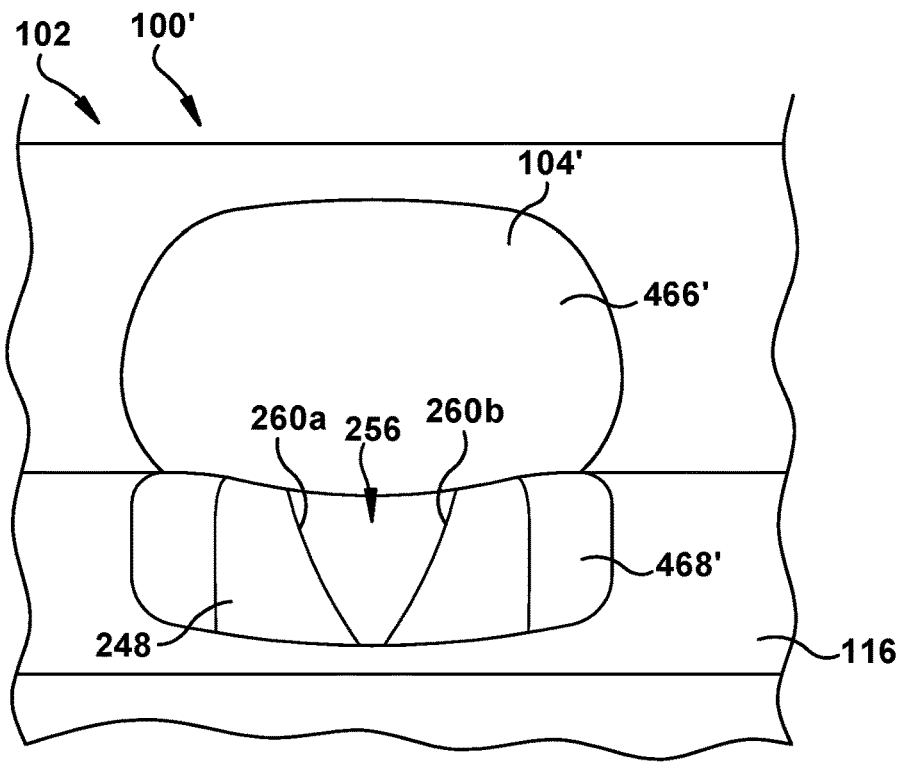
Figure 14:
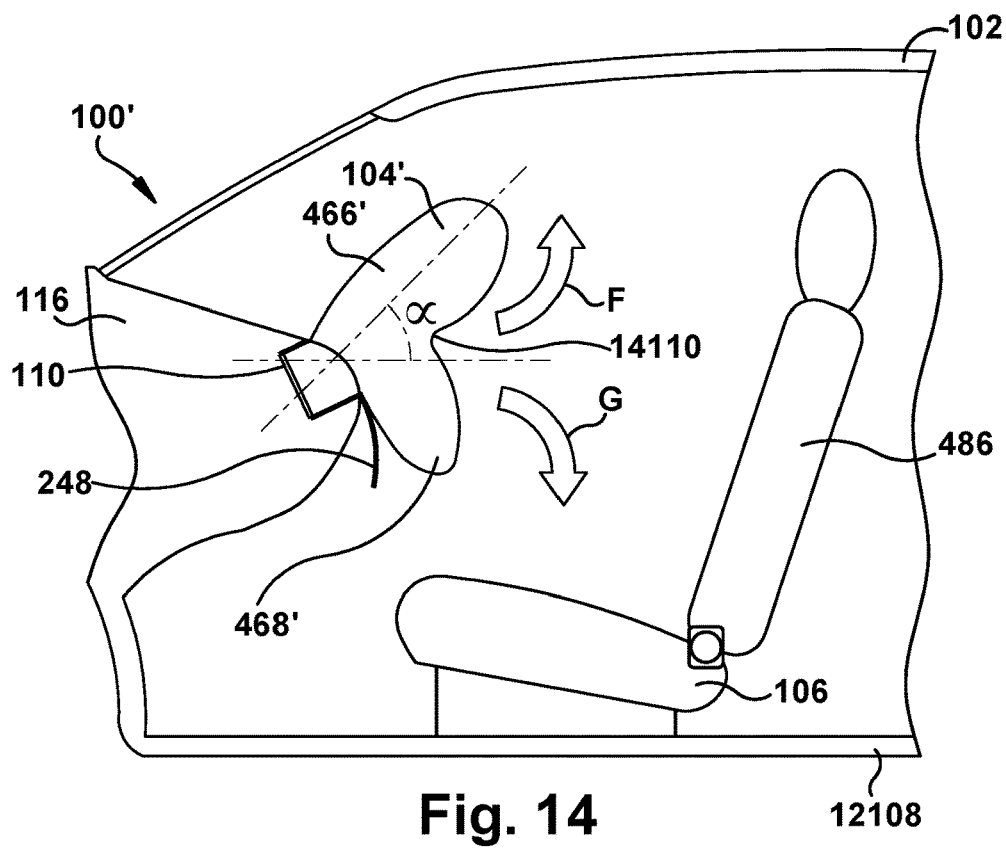

At a certain point in time during inflation of the airbag 104', the occupant's face 792 may engage the airbag at a location adjacent to the deployment flap 248, such as at the lower portion 468' of the airbag. In such case, because the deployment flap 248 has the notch 256, the occupant's face 792 does not engage, or at least does not substantially engage, the deployment flap. In particular, the notch 256 is configured so that the opposite side edges 260a, 260b of the notch are positioned on opposing side edges of at least a portion of the occupant's face 792, such as the occupant's chin 794, when a portion of the occupant's face engages the airbag 104' during the initial inflation and deployment of the airbag. As shown in FIG. 13, the notch 256 thus forms a recess in the deployment flap 248 for receiving the occupant's face 792 so that the occupant's face substantially engages the airbag 104', such as the lower portion 468' of the airbag, and does not engage, or at least does not substantially engage, the deployment flap. As shown in FIGS. 12-14, the notch 256 in the deployment flap 248 does not hinder the deployment flap's ability to impede or inhibit the lower portion 468' from inflating and deploying freely as the airbag 104' initially inflates and deploys.

As shown in FIG. 14, once the airbag 104' inflates and pressurizes to a degree at which the friction between the deployment flap 248 and the lower portion 468' is overcome, the delay/inhibition is relieved and the lower portion is permitted to inflate and deploy freely. The roll/fold of the lower portion 468' can be such that it deploys downward along the instrument panel 116 and becomes positioned between the instrument panel 116 and an occupant of an adjacent seat 106. As this occurs, the deployment flap 248 moves out of the way to a position extending downward along the instrument panel 116 and becomes positioned between the airbag 104' and the instrument panel. The notch 256 provides the added benefit that the deployment flap 248 does not move or drag across the occupant's face 792 as the deployment flap moves to a position extending downward along the instrument panel 116 because the occupant's face is positioned in the notch, i.e., between the opposing side edges 260a, 260b of the notch, during the initial inflation and deployment of the airbag 104'.

Testing has shown that simultaneous deployment of the upper and lower portions 466', 468' of the airbag 104' can cause the airbag to deploy generally rearward in the vehicle 102 as a whole, toward the occupant, as opposed to individually at angles with respect to each other. It has been found, however, that as a result of implementing the deployment flap 248 to restrict and delay the initial deployment of the lower portion 468' while leaving the upper portion 466' free or substantially free from impediment, restriction and/or inhibition from the deployment flap 248, the upper portion can be caused to deploy in advance of the lower portion, as shown in FIG. 12. Because deployment of the lower portion 468' is inhibited/delayed, it occupies space through which the freely deploying upper portion 466' can deploy. This "forces" the upper portion 466' to deploy above or over the lower portion 468' in a manner at least partially dictated by its roll/fold configuration. Advantageously, the roll/fold of the upper portion 466' can be configured to produce the desired deployment trajectory. This allows, for example, the upper portion 468' to deploy in a desired trajectory/direction, such as generally upward and rearward in the vehicle 102, as shown by the arrow F.

It can be desirable for the upper and/or lower portions 466', 468' to deploy at certain angles depending, for example, on the vehicle configuration or platform. For example, it can be desirable for the upper portion 466' to deploy at a 45 degree angle from a vehicle floor 12108, as is shown generally in FIG. 12 at "a". Tailoring the configuration of the apparatus 100', particularly the deployment flap 248, can cause the upper portion 466' to deploy at this trajectory/direction or another different trajectory/direction. The deployment trajectory/direction depends at least in part on the degree and duration of the frictional engagement between the deployment flap 248 and the airbag 104'. It will therefore be appreciated that airbag deployment can be tailored by adjusting factors that determine the degree/duration of the frictional engagement between the lower portion 468' and the deployment flap 248. For example, the roll/fold configuration of the stored airbag 104', the frictional properties of the material used to construct the deployment flap 248 and/or airbag, the amount of overlap of the deployment flap and the airbag, the degree to which the airbag is heated/compressed and packaged in the airbag module 110, the construction of the instrument panel 116, the construction of the airbag module and/or housing 114, or a combination of the factors can be tailored to cause the upper portion 466' to deploy in a desired trajectory/direction.

Figure 15:
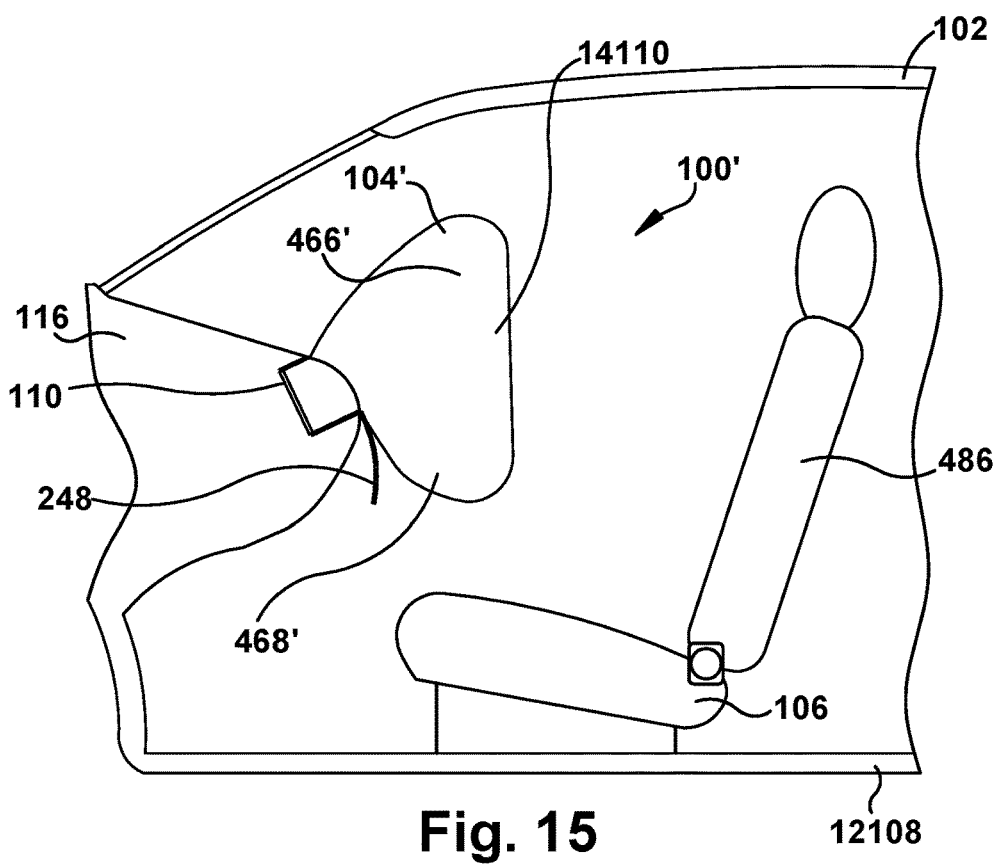

As a result, it can be seen that the deployment flap 248 can be implemented in a manner such that the upper portion 466' deploys upward/rearward at a desired trajectory a, e.g., 45 degrees from the vehicle floor 12108, and the lower portion 468' deploys downward along the instrument panel 116, as shown in FIG. 14. Advantageously, the upper portion 466' can be configured to deploy above a small occupant, a forward positioned occupant, an out of position (e.g., leaned forward) occupant, or an occupant having a combination of these characteristics. The lower portion 468' can deploy, as set forth above, along the instrument panel 116, which is the best scenario for the occupants. As a result, the airbag 104' avoids deploying directly into contact with the occupant, especially the head and upper torso of the occupant. Instead, the upper portion 466' deploys upward and the lower portion 468' deploys downward as described above, which deploys a portion of the airbag 104', e.g., a central deployed portion 14110, more gently toward the head/upper torso of the occupant, as shown in FIGS. 14-15.

FIGS. 16-22 depict the apparatus 100, shown here as the apparatus 100", in another example configuration. Certain components in FIGS. 16-22 are similar or identical to components of the example configurations of FIGS. 1-9 and 10-15. These similar or identical components are given the same reference as FIGS. 1-9 and 10-15. On the other hand, the double prime symbol is added to the reference numbers of components in FIGS. 16-22 that are at least partially dissimilar to the components of FIGS. 1-9 and 10-15 to avoid confusion.

In the example configuration depicted in FIGS. 16-22, the airbag 104" is a passenger airbag for helping to protect an occupant 101 of a rear seat 106 (shown here as 106b) behind a front seat 106 (shown here as 106a) of the vehicle. The front seat 106a is positioned behind and presented towards an instrument panel 116. The airbag 104" of FIGS. 16-22 can be positioned on a driver side 16112 (as shown) or the passenger side 108 of the vehicle 102. The vehicle 102 also includes a roof 16114 and a seatbelt 16116 connected to the rear seat 106b for helping to protect the vehicle occupant 101.

Figure 16:
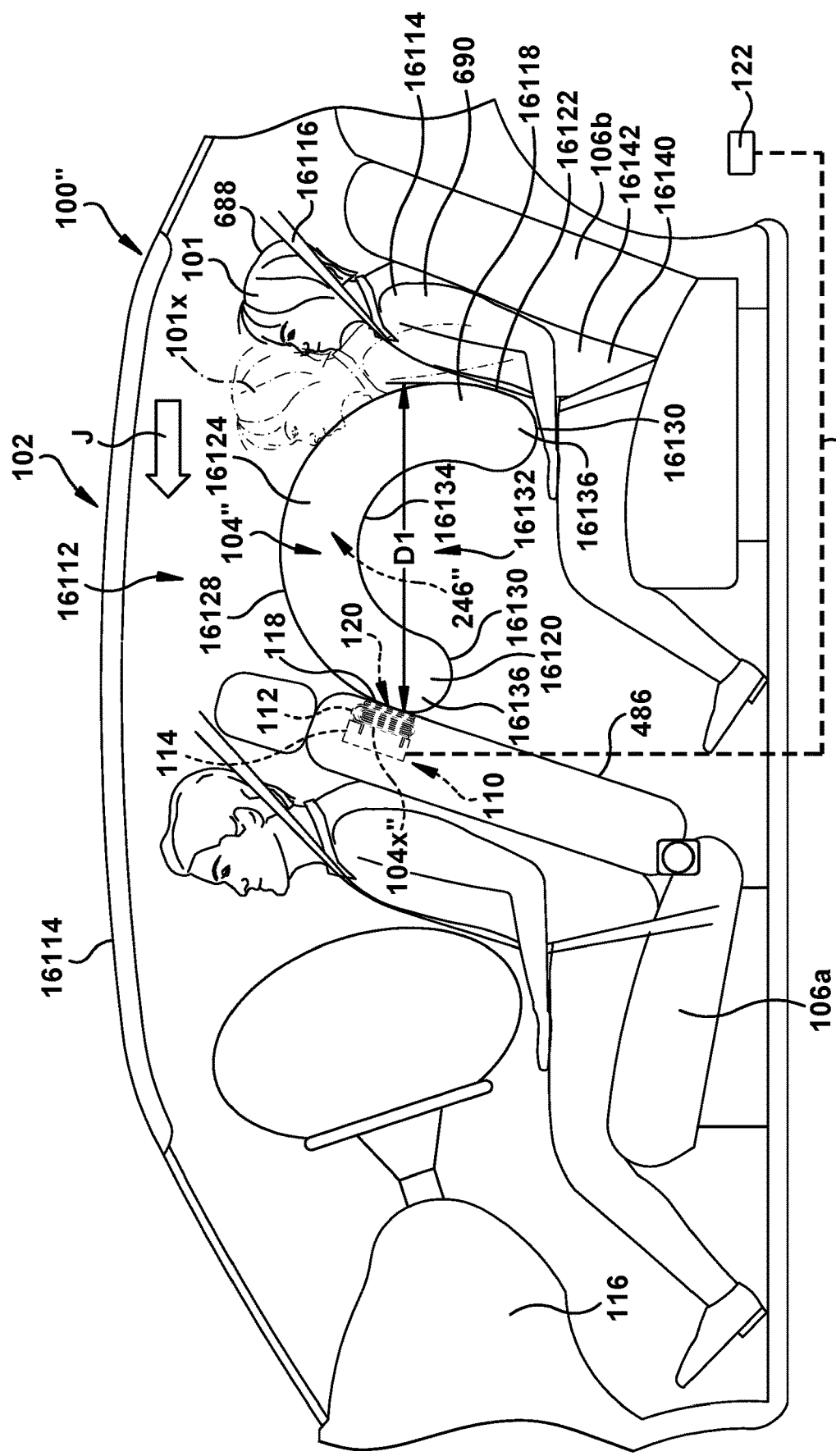
FIG. 16 is a schematic side view illustrating an apparatus for helping to protect an occupant of a vehicle, in a third example configuration.

As shown in FIG. 16, the airbag 104" can be part of the airbag module 110 that includes the inflator 112 and the housing 114. The airbag 104" has the stored condition, indicated by dashed lines and at 104x" in FIG. 16, in which the airbag is folded and placed in a stored condition within the housing 114. The module 110 is mounted to or within the seat back 486 of the front seat 106a of the vehicle 102. The housing 114 helps contain and support the airbag 104" and the inflator 112 in the seat back 486. Alternatively, the airbag module 110 can be mounted in the B-pillar, door, rear seat cushion, center console, instrument panel 116 or roof 16114 of the vehicle 102 (not shown). At least a portion of the airbag 104" can be connected to the retainer 1096 in any known manner, such as through apertures 242 for receiving fasteners 344', such as bolts or studs, of the retainer. The airbag 104" and the retainer 1096 can be part of the airbag module 110 that includes the inflator 112 and the housing 114.

The airbag door 118 can be releasably connected to the seat back 486 and/or the housing 114. In a closed condition, the airbag door 118 forms a cover for the airbag module 110 and helps enclose the airbag 104" in the stored condition in the housing 114 within the seat back 486. The airbag door 118 is movable to an opened condition that uncovers the opening 120 in the housing 114 and seat back 486 through which the airbag 104" can be deployed from the stored condition in the housing 114 to an inflated and deployed condition. The airbag door 118 can be connected to the vehicle 102, e.g., connected to the seat back 486, either directly or through the housing 114, by means (not shown), such as a plastic hinge portion, a strap or a tether.

The inflator 112 is actuatable to provide inflation fluid to the inflatable volume 246" of the airbag 104" to deploy the airbag to the inflated condition. The apparatus 100" of the example configuration of FIGS. 16-22 includes the sensor 122 for sensing an event for which inflation of the airbag 104" is desired, such as a collision. The inflator 112 is operatively connected to the sensor 122 via the lead wires 124.

The airbag 104" can be constructed of any suitable material, such as nylon (e.g., woven nylon 6-6 yarns), and can be constructed in any suitable manner. For example, the airbag 104" can include one or more pieces or panels of material. If more than one piece or panel is used, the pieces or panels can be interconnected by known means, such as stitching, ultrasonic welding, heat bonding or adhesives, to form the airbag 104". The airbag 104" can be uncoated, coated with a material, such as a gas impermeable urethane or laminated with a material, such as a gas impermeable film. The airbag 104" thus can have a gas-tight or substantially gas-tight construction. Those skilled in the art will appreciate that alternative materials, such as polyester yarn, and alternatives coatings, such as silicone, can also be used to construct the airbag 104".

Figure 17:
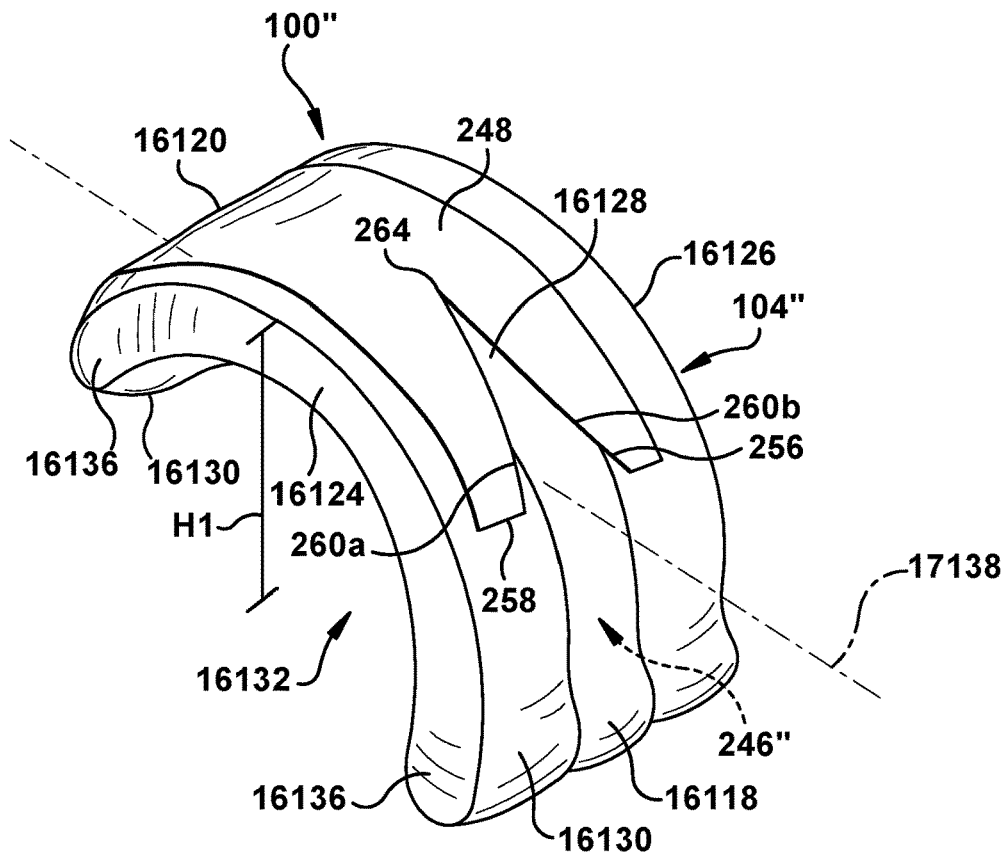
FIG. 17 is a perspective view of a portion of the apparatus of FIG. 16.

In the illustrated embodiment, the airbag 104" is constructed of one or more panels of material interconnected to define the inflatable volume 246" of the airbag having the configuration illustrated in FIGS. 16-22. Referring to FIGS. 16-17, the inflated airbag 104" deploys from a stored condition in the housing 114 away from the seat back 486 in the rearward direction toward the occupant 101 in the rear seat 106b into the deployed condition in which the airbag is positioned between the seat back 486 of the front seat 106a and the occupant 101 of the rear seat. The seat back 486 therefore acts as a reaction surface of the vehicle 102 for the deploying airbag 104". The airbag 104" has a hook-shape or an inverted U-shape configuration when viewed from the side and a generally rectangular shape when viewed from the top (not shown). The inflated airbag 104" includes a front portion 16118 adjacent the occupant 101 and a rear portion 16120 adjacent the seat back 486 of the front seat 106b.

In the deployed condition, the front portion 16118 is spaced from the front seat 106a and includes a front panel or surface 16122 presented towards the occupant 101 in the rear seat 106b. The rear portion 16120 is positioned adjacent and connected to the seat back 486 via its connection to the airbag module 110. The front panel 16122 is spaced from the seat back 486 by a distance or depth D1 extending in a forward-rearward direction of the vehicle 102. Lateral portions 16124, 16126 extend between the front portion 16118 and the rear portion 16120. The lateral portions 16124, 16126 extend substantially parallel to one another on opposite sides of the airbag 104". The lateral portion 16124 is positioned outboard in the vehicle 102 and the lateral portion 16126 is positioned inboard in the vehicle.

A top portion 16128 is presented toward the vehicle roof 16114 and connects the front portion 16118 to the rear portion 16120. A bottom portion 16130 is positioned nearer the rear seat 106*b*. The front portion 16118, the rear portion 16120, the lateral portions 16124, 16126, the top portion 16128, and the bottom portion 16130 cooperate with one another to help define the inflatable volume 246" of the airbag 104". Each of the front portion 16118, the rear portion 16120, the lateral portions 16124, 16126, the top portion 16128, and the bottom portion 16130 can include non-inflatable portions (not shown) in addition to their respective inflatable portions.

The airbag 104" includes a space 16132 defining an uninflated or unpressurized volume outside the inflatable volume 246". In the construction shown in FIG. 17, the space 16132 extends from the bottom portion 16130 towards the top portion 16128. The space 16132 extends entirely between the lateral portions 16124, 16126 and terminates at an inner surface 16134 of the top portion 16128. Consequently, the airbag 104" is bifurcated into two inflatable lobes 16136 spaced apart from one another at the bottom portion 16130 and connected to one another by the top portion 16128 to help define the shape of the space 16132. Each of the lobes 16136 has substantially the same height in the vertical direction such that the airbag 104" is substantially symmetric about the top portion 16128. The airbag 104" shown in the example configuration of FIGS. 16-22 therefore has the shape of an arch, a hook, or an upside-down U.

As shown in FIG. 17, a midline 17138 extends through the airbag 104" in the forward-rearward direction of the vehicle 102. The midline 17138 is spaced equidistantly from the uppermost edge and the lowermost edge of the airbag 104", i.e., the midline is positioned half way along the airbag height, indicated generally at H1. In the example configuration shown in FIG. 17, the size of the front portion 16118, the top portion 16128, and the rear portion 16120 are chosen such that the space 16132 extends above the midline 17138, i.e., the space has a depth from the lowermost edge of the airbag 104" that is greater than half of the height H1 of the inflated airbag. Alternatively, the space 17138 can have a depth that is half or less than half of the height H1 of the airbag 104". The presence of the space 16132 in the airbag 104" reduces the size of the inflatable volume 246" in order to provide desirable inflation performance criterion.

Figure 18:
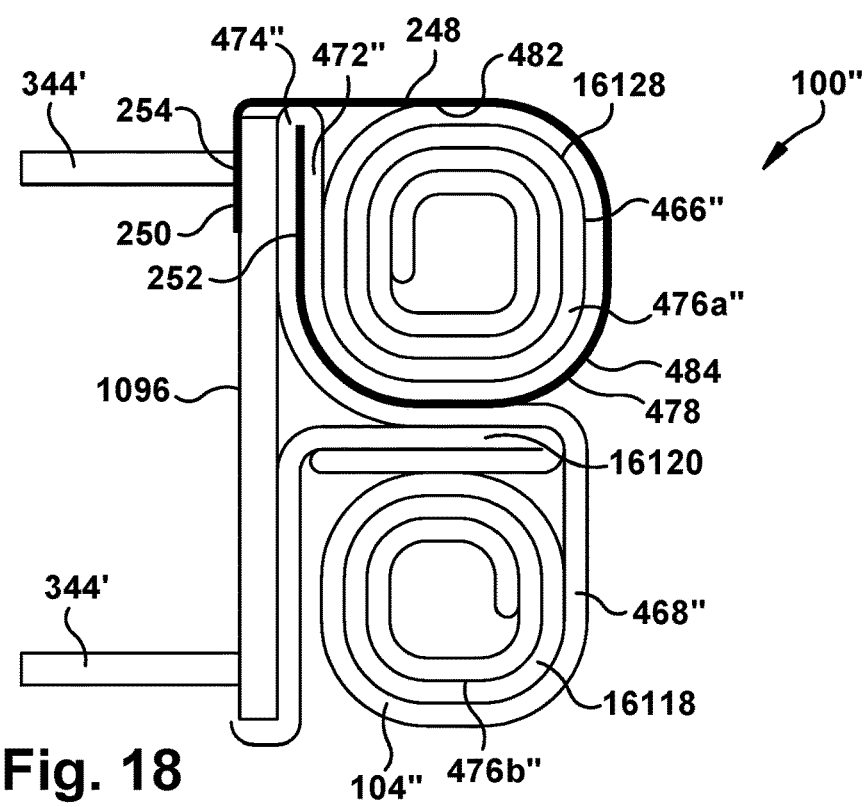
FIG. 18 is a side view of a portion of the apparatus of FIG. 1 in a deflated and stored condition.

As shown in FIGS. 17-18, the apparatus 100" includes the deployment flap 248 for helping to control deployment of the airbag 104". The first end portion 250 of the deployment flap 248 can be secured to the vehicle 102, such as through the airbag module 110. The deployment flap 248 can, for example, be secured to the airbag module 110 via the fasteners 344' (e.g., bolts or studs) of the retainer 1096. The deployment flap 248 has the one or more apertures 254 that receive the fasteners 344 that connect the deployment flap to the airbag module 110.

FIG. 18 shows the example configuration of the airbag 104" of FIGS. 16-22 in the stored condition. The airbag 104" has the first or upper portion 466" and the second or lower portion 468". The upper portion 466" of the airbag 104" in the stored condition comprises the top portion 16128 of the deployed airbag in a rolled/folded condition. The lower portion 468" of the airbag 104" in the stored condition comprises at least one of the rear and front portions 16120, 16118 of the deployed airbag in rolled/folded conditions. Referring to FIG. 18, the upper portion 466" has a flip-folded portion 472", i.e., a portion that is flipped or folded about a fold line indicated generally at 474", when the airbag 104" is in the stored condition. The upper portion 466" further comprises a roll-folded portion 476" (shown here as 476*a*"), i.e., a portion that is roll-folded toward the fold line 474", when the airbag 104" is in the stored condition. The roll-folded portion 476*a*" is positioned adjacent and overlying the flip-folded portion 472".

The lower portion 468" is folded/rolled to extend around and underlie the upper portion 466" wrapped in the deployment flap 248. The lower portion 468" comprises at least one of the front portion 16118 of the deployed airbag 104" that is roll-folded into a roll-folded portion 476" (shown here as 476*b*") and the rear portion 16120 of the deployed airbag that is flip-folded and positioned between the roll-folded portion 476*a*" of the upper portion 466" and the roll-folded portion 476*b*" of the lower portion. Thus, in the stored condition, the first surface 482 of the deployment flap 248 contacts at least a portion of the upper portion 466". The second surface 484 of the deployment flap 248 can contact at least a portion of the lower portion 468" when the deployment flap is positioned between the upper and lower portions 466", 468".

The deployment flap 248 extends from the retainer 1096 so that at least a portion of the deployment flap can be positioned between the upper and lower portions 466", 468" of the airbag 104" when the airbag is in the stored condition. In this configuration, the deployment flap 248 can at least partially surround the upper portion 466" of the airbag 104" when the airbag is in the stored condition. In particular, the deployment flap 248 is wrapped around the overlying flip-folded portion 472" and the roll-folded portion 476*a*". The deployment flap 248 has the second end portion 252 that is tucked under the flip-folded portion 472", and thus tucked under the upper portion 468", and accordingly the top portion 16128. The central portion 478 of the deployment flap 248 extends over, and is wrapped around, the upper portion 466", and accordingly the top portion 16128, and is positioned between the upper portion and the lower portion 468". The deployment flap 248 thus encircles or substantially encircles the upper portion 466".

The upper portion 466" and the lower portion 468" are thus packaged separately in the stored condition of FIG. 18. By "packaged separately," it is meant that the upper portion 466" and the lower portion 468" are rolled, folded, or otherwise placed in the stored condition as separate and distinct portions of the airbag 104". This allows the deployment flap 248 to be wrapped around the upper portion 466" without affecting the lower portion 468".

In one example construction, the deployment flap 248 can be formed from a material that provides a frictional engagement between the deployment flap and the upper portion 466" of the airbag 104". In another example construction, the deployment flap 248 can be constructed of a material, such as airbag fabric, that is coated with a material that provides a frictional engagement between the deployment flap and the upper portion 466" of the airbag 104". The material that the deployment flap 248 is formed from can be high-density polyethylene that provides the frictional engagement between the first deployment flap and the upper portion 466" of the airbag 104". Alternatively, the deployment flap 248 can be constructed of a different material, such as airbag fabric, that has a layer of material, such as high-density polyethylene, applied, such as by coating or lamination, that provides the frictional engagement between the deployment flap and the upper portion 466" of the airbag 104".

The frictional engagement between the deployment flap 248 and the upper portion 466" is sufficient to at least partially restrict and delay the initial deployment of the upper portion, and accordingly the top portion 16128, while the lower portion 468", and accordingly at least one of the front and rear portions 16118, 16120, deploys unrestricted or substantially unrestricted. Although at least a portion of the second surface 484 of the deployment flap 248 can contact at least a portion of upper portion 466", any frictional engagement between the upper portion and the second surface of the deployment flap is less than the frictional engagement between at least a portion of the lower portion 468" and the first surface 482 of the deployment flap so that the initial deployment of the upper portion is restricted and delayed while the lower portion deploys unrestricted or substantially unrestricted.

Upon sensing the occurrence of an event for which inflation of the airbag 104" is desired, such as a vehicle collision, the sensor 122 provides a signal to the inflator 112 via the lead wires 124. Upon receiving the signal from the sensor 122, the inflator 112 is actuated and provides inflation fluid to the inflatable volume 246" of the airbag 104" in a known manner. The inflating airbag 104" exerts a force on the airbag door 118, which moves the airbag door to the opened condition. The airbag 104" inflates from the stored condition to a deployed condition illustrated in FIGS. 16 and 22. The airbag 104", while inflated, helps protect the occupant 101 of the rear seat 106b from impacts with parts of the vehicle 102, such as the seat back 486 of the front seat 106a positioned in front of the occupant of the rear seat.

Figure 19:
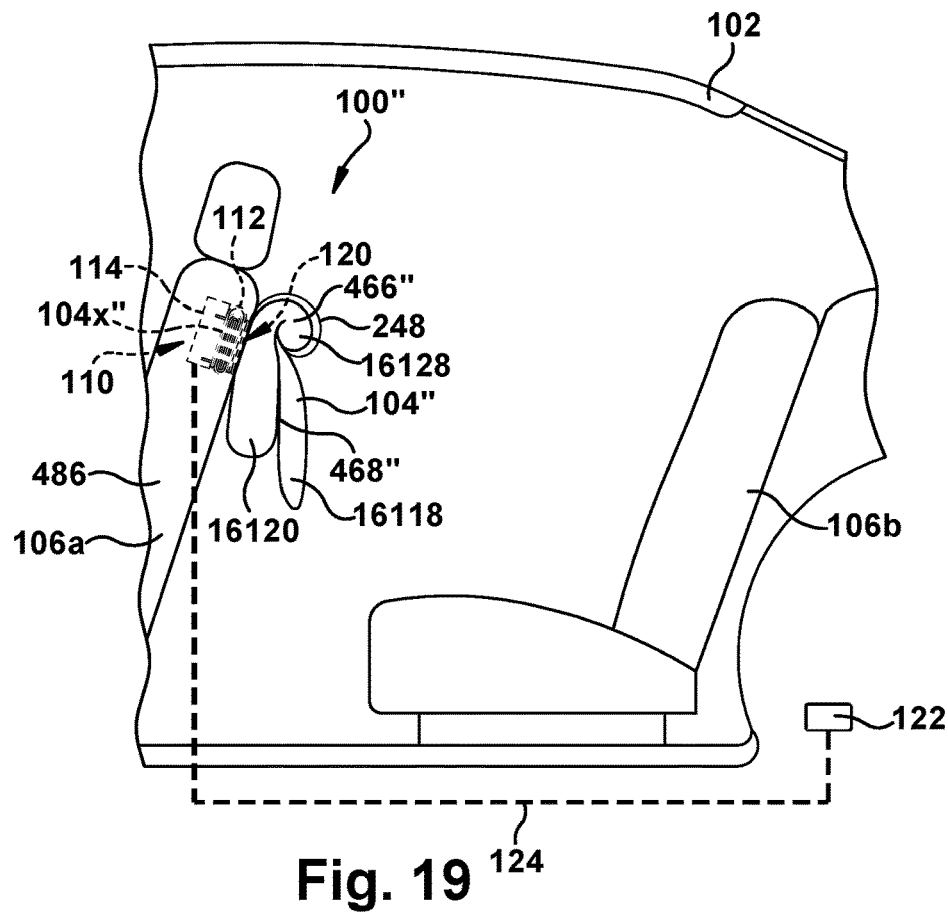
FIGS. 19-22 are schematic views illustrating an example sequence of operation of the apparatus of FIG. 16.
Figure 20:
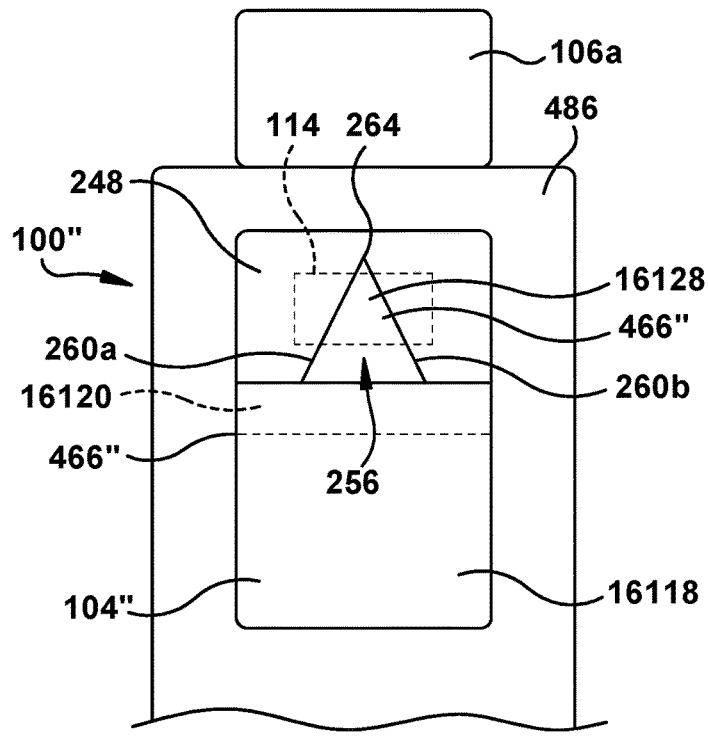
Figure 21:
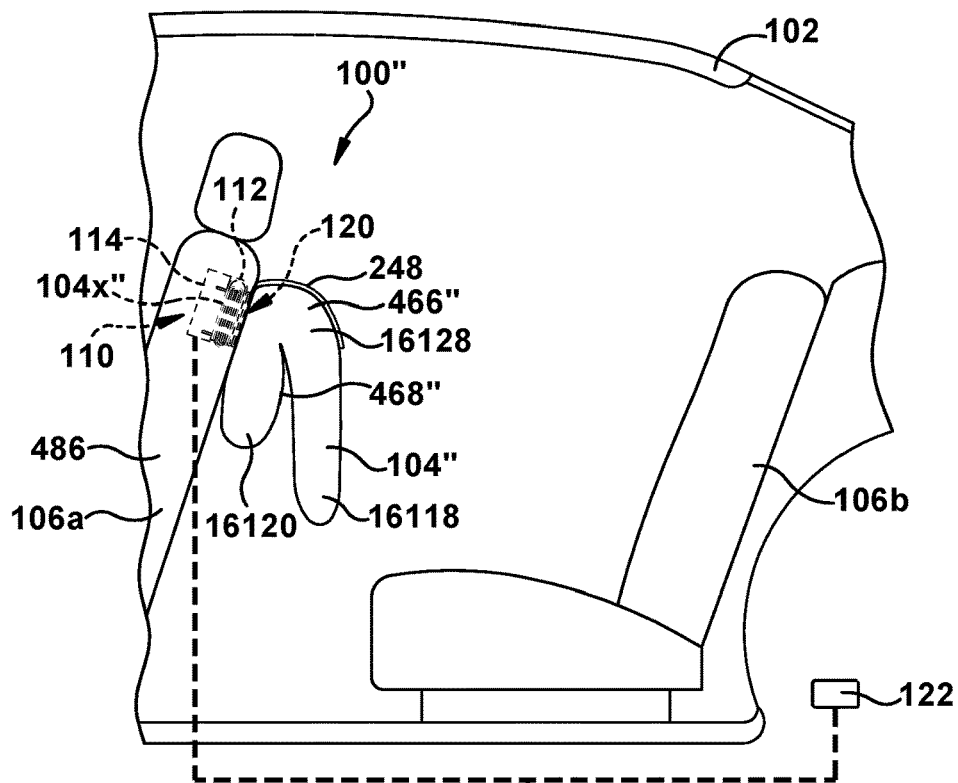

As shown in FIGS. 18-19, prior to inflation and during the initial inflation and deployment of the airbag 104", the deployment flap 248 at least partially surrounds or encircles the upper portion 466" of the airbag so as to at least partially restrict and delay the initial deployment of the upper portion, while the lower portion 468" deploys in advance of the restricted upper portion. For example, the particular folding and rolling of the airbag 104" of the example configuration of FIGS. 16-22 causes the general deployment of the lower portion 468" of the airbag to deploy downward along the seat back 486 of the front seat 106a so as to help protect occupant 101 of the rear seat 106b from impacts with the seat back of the front seat. The upper portion 466" is folded and rolled in such a manner that a portion of the upper portion, such as the roll-folded portion 476a", is urged to unfurl, i.e., deploy, into and/or against the deployment flap 248 as the airbag 104" initially inflates and deploys. As shown in FIGS. 19-21, the frictional engagement between the deployment flap 248 and the upper portion 466", and accordingly the top portion 16128, at least partially restricts, impedes and/or inhibits the upper portion from unfurling/deploying while the lower portion 468", and accordingly at least one of the front and rear portions 16118, 16120, deploys at least partially unimpeded. The restriction and delay of the deployment upper portion 466" restricts and delays the top portion 16128 of the airbag 104" from deploying in a trajectory/direction as shown as an arrow "H" in FIG. 22, which restricts and delays the front portion 16118 from being deployed to be spaced from the seat back 486 and the rear portion 16120 as described above. Thus, although the front portion 16118 may initially inflate and deploy, the front portion may be prevented from being positioned in the fully deployed condition, as shown in FIGS. 16 and 22, due to the restriction and delay of the deployment of the upper portion 466", and according the top portion 16128.

At a certain point in time during inflation of the airbag 104", the occupant's face 792 may engage the airbag at a location adjacent to the deployment flap 248, such as at the upper portion 466", and accordingly the top portion 16128, of the airbag. In such case, because the deployment flap 248 has the notch 256, the occupant's face 792 does not engage, or at least does not substantially engage, the deployment flap. In particular, the notch 256 is configured so that the opposite side edges 260a, 260b of the notch are positioned on opposing sides of at least a portion of the occupant's face 792, such as the occupant's chin 794, when a portion of the occupant's face engages the airbag 104" during the initial inflation and deployment of the airbag. As shown in FIG. 20, the notch 256 thus forms a recess in the deployment flap 248 for receiving the occupant's face 792 so that the occupant's face substantially engages the airbag 104", such as the upper portion 466", and accordingly the top portion 16128, of the airbag, and does not engage, or at least does not substantially engage, the deployment flap. As shown in FIGS. 19-22, the notch 256 in the deployment flap 248 does not hinder the deployment flap's ability to impede or inhibit the upper portion 466" from inflating and deploying freely as the airbag 104" initially inflates and deploys.

Figure 22:
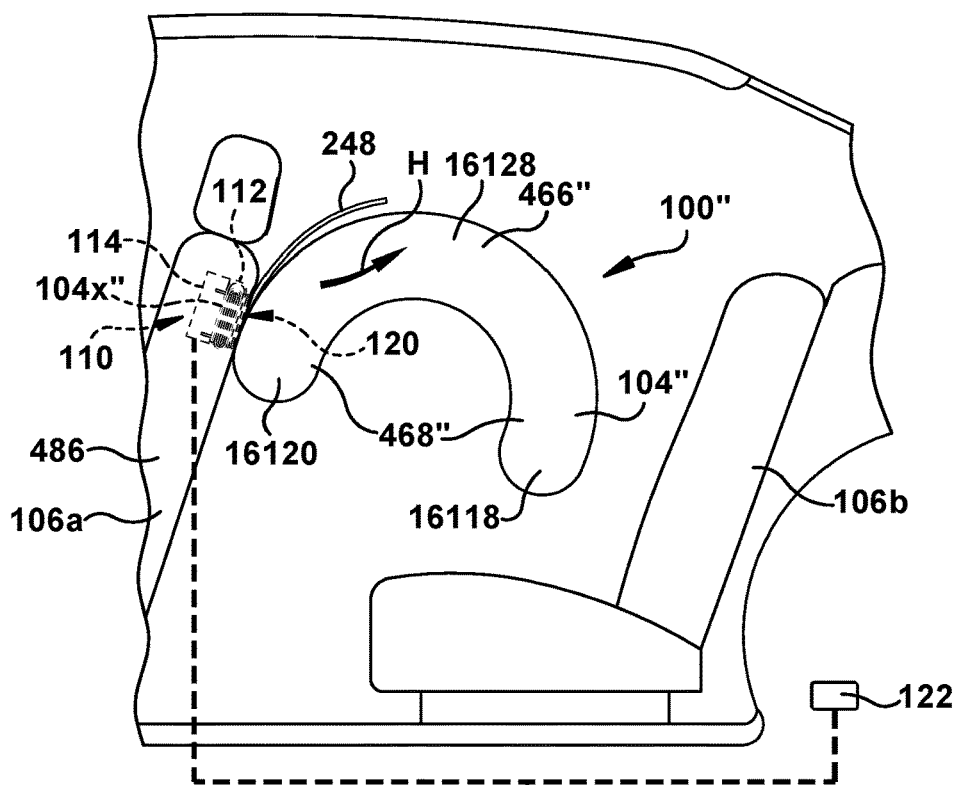

Referring to FIG. 22, the airbag 104" eventually inflates and pressurizes to a degree at which the friction between the deployment flap 248 and the upper portion 466" is overcome. At this point, the upper portion 466" is permitted to inflate and deploy. The upper portion 466" deploys upward and away from the seat back 486 of the front seat 106a in the direction indicated generally by the arrow H. The front portion 16118 becomes positioned between the occupant 101 and both of the seat back 486 of the front seat 106a and the rear portion 16120 of the airbag 104". The deployment flap 248 moves to a position extending over top of and along at least one of the rear and top portions 16120, 16128 of the deployed airbag 104". The notch 256 provides the added benefit that the deployment flap 248 does not move or drag across the occupant's face 792 as the deployment flap moves to a position extending over top of and along at least one of the rear and top portions 16120, 16128 of the deployed airbag 104" because the occupant's face is positioned in the notch, i.e., between the opposing side edges 260a, 260b of the notch, during the initial inflation and deployment of the airbag.

The airbag 104", when deployed, helps protect the occupant 101 by helping to absorb the force of impact placed on the airbag by the occupant. Referring to FIG. 16, when the occupant 101 impacts the airbag 104", the occupant penetrates the airbag, which absorbs and distributes the impact forces throughout the area and volume of the airbag. By "penetrates" into the airbag 104", it is meant to refer to the instance where, in the case of a frontal impact to the vehicle 102, the occupant 101 is moved forward, as indicated by the arrow labeled "J" and the dashed lines labeled 101x in FIG. 16, into engagement with the airbag. The "penetration" of the occupant 101 into the airbag 104" is the distance or degree to which the occupant moves into the inflated depth of the airbag relative to the point at which the occupant first engages the inflated airbag. i.e., engages the front panel 16122 of the front portion 16118.

In other words, the degree of penetration could be measured as the distance a given point on the front panel 16122 is moved toward the front seat 106a by the penetrating occupant 101x. For example, the degree of penetration in FIG. 16 can be calculated as the difference between the fully inflated depth D1 of the entire airbag 104" and the penetrated depth of the entire airbag (not shown) relative to the seat back 486. Alternatively, penetration could be measured as the change in distance between a point on the front panel 16122 and a fixed point on the front seat 106a facing the occupant or between a point on the occupant 101, e.g., the occupant's chest, and a fixed point on the seat back 486 starting when the occupant first contacts the airbag 104" (not shown).

Several factors determine the degree to which an occupant 101 penetrates the airbag 104". For example, the size or mass of the occupant 101, the speed at which the occupant strikes the airbag 104", and the pressurization of the airbag all help determine the degree to which the occupant penetrates the airbag in a given deployment scenario.

As shown in FIG. 16, in the case of a belted occupant 101, the seatbelt 16116 serves to help restrain the occupant. As a result, the belted occupant 101, especially the occupant's lower torso 16140 and hips 16142, is restrained from moving toward the front seat 106a. This allows the airbag 104" to inflate and deploy with comparatively little resistance or inhibition from the occupant 101. As shown in dashed lines at 101x, the belted occupant's head 688 penetrates the front portion 16122 of the airbag 104" and, more specifically, penetrates the front panel 16122 of the airbag near the top portion 16128. The belted occupant's head 688 can also penetrate the top portion 16128 of the airbag 104", depending on the size of the occupant and/or the height H1 of the airbag. The belted occupant's upper torso 16144 penetrates the bottom portion 16130 of the airbag 104" at the front lobe 16136.

Due to the configuration of the airbag 104", the front portion 16118 is deflected by the penetrating occupant 101 in a direction towards the front seat 106a and, thus, the front portion is deflected towards the rear portion 16120 of the airbag. Since the space 16132 is unpressurized and positioned between the front portion 16118 and the rear portion 16120, the front portion is deflected into the space and closer to the rear portion. The degree or distance to which the occupant 101x penetrates the airbag 104" can be comparatively or relatively small. The airbag 104" can be configured such that the front portion 16118 remains spaced from the rear portion 16120 throughout full penetration of the belted occupant 101 into the front portion. To this end, the stiffness of the airbag 104" can be tailored to ensure the volume of the space 16132 does not completely disappear when the occupant 101 penetrates the airbag.

Due to the space 16132 between the front and rear portions 16118, 16120, the restraint forces provided by the lower portions of the airbag 104" are less (softer) than the restraint forces provided by the upper portions because the front portion can deflect into the space in a pivotal or sliding fashion via the joining region to the top portion 16128. In other words, since the space 16132 is not pressurized as it would be in an airbag 104" volume that is continuous throughout the entire depth D1 the size of the inflatable volume 246" the occupant 101 interacts with is reduced and, thus, restraint by the lower portions of the airbag is initially softer relative to a continuous bag design. If the occupant 101 penetrates the airbag 104" sufficient to cause the front portion 16118 to contact the rear portion 16120, then the restraint by the contacted portions will become stiffer such that engagement of the penetrating occupant 101x with the front seat 106a can be avoided.

In contrast, the top portion 16128 of the airbag 104" extends substantially continuously from the back of the front seat 106a to the occupant 101 with little or no open space. The top portion 16128 therefore provides a stiffer restraint to the penetrating occupant's head 688 and upper torso 16144 relative to the restraint provided by the lobe 16136 to the occupant's lower torso 16140. The airbag 104" of the present invention is therefore advantageous in providing variable restraint to the penetrating occupant 101x in order to meet desirable performance criterion.

If the belted occupant 101 penetrates into the airbag 104" sufficient to cause the front portion 16118 to engage the rear portion 16120, i.e., the space 16132 between the front portion and the rear portion substantially or entirely disappears, the airbag of the present invention produces substantially the same occupant restraint as two smaller volume airbags positioned adjacent and abutting one another in the fore-aft direction. In other words, such a dual airbag configuration would result in substantially the same homogenous occupant 101 restraint as the single volume airbag 104" of the present invention provided with the unpressurized space 16132.

Engagement of the front portion 16118 with the rear portion 16120 occurs with larger occupants 101 and/or in higher speed crash events. Consequently, this resulting stiffening of restraint during the later stages of a crash event is advantageous for reducing the possibility of occupant-to-front seat 106a contact. The space 16132 of the present invention advantageously allows the airbag 104" to provide variable occupant 101 restraint by region, i.e., head 688 vs. torso 690, as well as restraint that varies, i.e., stiffens, if and when the head 688 and upper torso 16144 get close enough to the front seat 106a that the space collapses to at or near zero volume.

The low volume configuration of the airbag 104" also facilitates earlier initiation of restraint since the reduced volume airbag can be positioned and filled more rapidly compared to a continuous volume airbag. There is also the potential to reduce the required size and cost of the inflator 112.

The inflator 112, top portion 16128, front portion 16118, and the space 16132 of the airbag 104" are sized to provide a volume of inflation fluid sufficient to inflate, deploy, and pressurize the airbag to the inflated condition of FIG. 16 within desired performance parameters. Since the belted occupant 101 is the expected condition, the top portion 16128, front portion 16118, and space 16132 configurations of FIG. 16 help bolster the reliability of the apparatus.

Furthermore, those having ordinary skill appreciate that the low volume construction of the airbag 104" of the present invention can allow the airbag to be free of active or adaptive venting while still providing variable restraint for the penetrating occupant 101x. The low volume construction of the airbag 104" of the present invention also allows the height of the front portion 16122 of the airbag to be increased sufficient to engage the roof 16114 to accommodate taller occupants without compromising the ability of the airbag to provide variable occupant restraint.

From the above description of the invention, those skilled in the art will perceive improvements, changes and modifications. For example, although FIGS. 1-22 depict example configurations of the apparatus 100, 100', 100", any of these example configurations may, or may not, include the features and/or example constructions, and accordingly the functions of those features and/or example constructions, of any other of the example configurations whether expressly stated, shown, or not. Further, the deployment flap 248 may be utilized in any type of airbag to at least partially restrict and delay a portion of the airbag while providing the notch 256 so that the occupant 101 can engage the airbag without engaging the deployment flap during the initial inflation and deployment of the airbag. Such improvements, changes and modifications within the skill of the art are intended to be covered by the appended claims.

Having described the invention, the following is claimed:

1. An apparatus for helping to protect an occupant of a vehicle, comprising:
an airbag inflatable from a stored condition to a deployed condition in which the airbag is configured for positioning between a reaction surface of the vehicle and the vehicle occupant, the airbag comprising an upper portion and a lower portion, each of the upper and lower portions being at least one of rolled and folded, the upper and lower portions being positioned overlying each other when in the stored condition; and
a deployment flap comprising a sheet of material having a first end portion and an oppositely disposed second end portion, the first end portion being secured to the vehicle, a portion of the deployment flap being positioned between the upper and lower portions, the deployment flap having a notch with opposite side edges converging in a direction toward the first end portion of the deployment flap and terminating at a vertex.

2. The apparatus of claim 1, wherein the notch is configured so that opposite side edges are positioned on opposing sides of a portion of the occupant's face when a portion of the occupant's face engages the airbag during initial deployment of the airbag.

3. The apparatus of claim 2, wherein the notch is triangular-shaped and opens at the second end portion of the deployment flap, the opposite side edges converging from the second end portion in a direction toward the first end portion.

4. The apparatus of claim 1, wherein the deployment flap is at least one of formed from and coated with a material that provides a frictional engagement between the deployment flap and one of the upper and lower portions sufficient to at least partially restrict and delay the initial deployment of one of the upper and lower portions.

5. The apparatus of claim 4, wherein the deployment flap at least partially surrounds one of the upper and lower portions of the airbag when the airbag is in the stored condition so as to at least partially restrict and delay initial deployment of the surrounded one of the upper and lower portions.

6. The apparatus of claim 5, wherein during deployment of the airbag, as a result of the deployment flap restricting and delaying the initial deployment of one of the upper and lower portions, the other of the upper and lower portions deploys in advance of the restricted one of the upper and lower portions.

7. The apparatus of claim 4, wherein the deployment flap has a first surface and a second surface, the first surface of the deployment flap contacting at least a portion of the lower portion when the deployment flap is positioned between the upper and lower portions, the second surface of the deployment flap contacting at least a portion of the upper portion when the deployment flap is positioned between the upper and lower portions.

8. The apparatus of claim 7, wherein the frictional engagement between the lower portion and the first surface of the deployment flap is greater than frictional engagement between the upper portion and the second surface of the deployment flap.

9. The apparatus of claim 4, wherein the deployment flap has a first surface and a second surface, the first surface of the deployment flap contacting at least a portion of the upper portion when the deployment flap is positioned between the upper and lower portions, the second surface of the deployment flap contacting at least a portion of the lower portion when the deployment flap is positioned between the upper and lower portions.

10. The apparatus of claim 9, wherein the frictional engagement between the upper portion and the first surface of the deployment flap is greater than frictional engagement between the lower portion and the second surface of the deployment flap.

11. The apparatus recited in claim 4, wherein the deployment flap comprises a central portion wrapped around the lower portion and the second end portion is tucked under the lower portion while the airbag is in the stored condition.

12. The apparatus recited in claim 11, wherein the deployment flap helps inhibit initial inflation and deployment of the lower portion, the deployment flap being free from inhibiting initial inflation and deployment of the upper portion.

13. The apparatus recited in claim 12, wherein the deployment flap is at least partially around and tucked under the lower portion to frictionally engage and thus inhibit initial inflation and deployment of the lower portion.

14. The apparatus recited in claim 4, wherein the deployment flap comprises a central portion wrapped around the upper portion and the second end portion is tucked under the upper portion while the airbag is in the stored condition.

15. The apparatus recited in claim 14, wherein the deployment flap helps inhibit initial inflation and deployment of the upper portion, the deployment flap being free from inhibiting initial inflation and deployment of the lower portion.

16. The apparatus recited in claim 15, wherein the deployment flap is at least partially around and tucked under the upper portion to frictionally engage and thus inhibit initial inflation and deployment of the upper portion.

17. The apparatus recited in claim 1, further comprising a housing for receiving the airbag in the stored condition, the airbag and the deployment flap being secured to the housing.

18. The apparatus recited in claim 1, wherein in the deployed condition, the airbag comprises:
a front portion presented toward a vehicle seat and having an inflatable volume configured for receiving a penetrating occupant when the airbag is in the deployed condition;
a rear portion connected to the front portion and having an inflatable volume spaced from the front portion by a space, the front portion being configured for positioning between the vehicle occupant and the rear portion when the protection device is in the deployed condition; and
a top portion interconnecting the front portion and the rear portion such that the airbag is hook-shaped in the deployed condition, wherein only the top portion connects the front portion to the rear portion.

19. The apparatus of claim 18, wherein the upper portion of the airbag in the stored condition comprises the top portion and the lower portion of the airbag in the stored condition comprises at least one of the rear and front portions.

20. The apparatus recited in claim 19, wherein the deployment flap comprises a central portion wrapped around the top portion, and the second end portion is tucked under the the top portion, while the airbag is in the stored condition.

21. The apparatus of claim 20, wherein the deployment flap is at least one of formed from and coated with a material that provides a frictional engagement between the deployment flap and one of the upper and lower portions sufficient to at least partially restrict and delay the initial deployment of one of the upper and lower portions.

22. The apparatus recited in claim 21, wherein the deployment flap is at least partially wrapped around and tucked under the the top portion to frictionally engage and thus inhibit initial inflation and deployment of the the top portion.

23. The apparatus recited in claim 18, wherein the airbag is a rear airbag for helping to protect a rear seat occupant of the vehicle, the airbag being stored in a seat back of a front seat of the vehicle such that seat back comprises the reaction surface.

24. The apparatus recited in claim 1, wherein the airbag is a frontal airbag for helping to protect a front seat occupant of the vehicle, the airbag being stored in an instrument panel of the vehicle such that instrument panel comprises the reaction surface.

25. The apparatus recited in claim 24, wherein the airbag is a passenger frontal airbag for helping to protect a front seat occupant on a passenger side of the vehicle.

26. An airbag module comprising the apparatus of claim 1.

27. A vehicle safety system comprising the airbag module of claim 26.

* * * * *